US006979197B2

(12) United States Patent
Cho et al.

(10) Patent No.: US 6,979,197 B2
(45) Date of Patent: Dec. 27, 2005

(54) GLOBE APPARATUS FOR SHOWING ROTATION AND REVOLUTION

(75) Inventors: In-Hyung Cho, Seoul (KR); Ju-Hyung Cho, Seoul (KR)

(73) Assignee: Mamstar.com, (KR)

( * ) Notice: Subject to any disclaimer, the term of this patent is extended or adjusted under 35 U.S.C. 154(b) by 0 days.

(21) Appl. No.: 10/790,306

(22) Filed: Mar. 1, 2004

(65) Prior Publication Data

US 2004/0253564 A1   Dec. 16, 2004

Related U.S. Application Data

(63) Continuation of application No. PCT/KR02/01646, filed on Aug. 30, 2002.

(51) Int. Cl.[7] .............................................. G09B 27/08
(52) U.S. Cl. ........................ 434/136; 434/142; 434/145
(58) Field of Search ............................... 434/130, 131, 434/136, 137, 142, 143, 145, 284, 285, 287, 434/288, 290, 291, 292, 293

(56) References Cited

U.S. PATENT DOCUMENTS

| | | | | |
|---|---|---|---|---|
| 2,492,785 | A | * | 12/1949 | Concordet .................. 434/143 |
| 2,680,308 | A | * | 6/1954 | Miltenberger ............... 434/143 |
| 4,056,927 | A | * | 11/1977 | Wilson ........................ 368/24 |
| 4,141,156 | A | * | 2/1979 | Holtvoigt .................... 434/139 |
| 4,477,193 | A | * | 10/1984 | Yasufuku ..................... 368/24 |
| 4,493,648 | A | * | 1/1985 | Suzuki ....................... 434/136 |
| 4,936,779 | A | | 6/1990 | Carlson |
| 4,971,559 | A | * | 11/1990 | Amano ....................... 434/143 |
| 5,033,965 | A | * | 7/1991 | Chiu et al. .................. 434/131 |
| 5,057,024 | A | * | 10/1991 | Sprott et al. ................ 434/146 |
| 5,132,943 | A | * | 7/1992 | Davies ........................ 368/21 |
| 5,280,458 | A | * | 1/1994 | Scott .......................... 368/24 |
| 5,344,325 | A | | 9/1994 | Wang |
| 5,545,041 | A | * | 8/1996 | Tsuzuki ...................... 434/136 |
| 6,196,693 | B1 | * | 3/2001 | Glynn ......................... 362/35 |
| 6,299,451 | B1 | | 10/2001 | Davila |

FOREIGN PATENT DOCUMENTS

KR        1990-10624        9/1990

* cited by examiner

Primary Examiner—Kurt Fernstrom
(74) Attorney, Agent, or Firm—St. Onge Steward Johnston & Reens, LLC

(57) ABSTRACT

Disclosed is a globe apparatus for showing rotation and revolution at the same time. The globe apparatus includes: a base to which one end of at least one support rod is fixed and one end of a revolution axis is rotatably fixed; a support arm fixedly coupled with the support rod; an Earth globe rotatably coupled with the support arm at two confronting points of the Earth globe with an inclination, and rotating; and a revolution unit placed inside the Earth globe and revolving relative to the two confronting points with coupled with the revolution axis, and showing day and night separately according to the rotation of the Earth globe.

11 Claims, 21 Drawing Sheets

GLOBE APPARATUS FOR SHOWING ROTATION AND REVOLUTION

This application is a continuation of pending International Patent Application No. PCT/KR02/01646 filed Aug. 30, 2002 which designates the United States and claims priority of pending Korean Application Nos. 2001-53646 filed Aug. 31, 2001, 2001-67280 filed Oct. 30, 2001 and 2002-51332 filed Aug. 29, 2002.

FIELD OF THE INVENTION

The present invention relates to a globe apparatus for showing rotation and revolution, and more particularly, to a globe apparatus having a body rotating on a rotation axis with an inclination and a revolution unit installed inside the body, for showing the revolution state of the Earth inside the body, in which the states of rotation and revolution of the Earth are simultaneously shown by a single apparatus.

BACKGROUND ART

Generally, a globe is figured to have a base, an arch-shaped bearing arm fixed on the base, and a hollow sphere slidably coupled with the bearing arm on the both ends of the bearing arm, and the surface of the hollow sphere has lands, seas, mountains, and countries of the Earth flatways (two-dimensionally) or cubic-ways (three-dimensionally) formed thereon. The globe is normally used for a decoration, and sometimes, it could be used for practical usages by indicating some information on the latitude and the longitude of the Earth.

The more improved version of the globe is disclosed in the U.S. Pat. No. 6,299,451. It has a light-emitting device inside an Earth globe, and visually shows the division of day-and-night with engaged with a clock device.

However, most of the conventional globes are just limited to show the rotation (the state of the Earth being rotated on its axis in one cycle per day) only of the Earth, and it is almost impossible to show the rotation and the revolution (the state of the Earth being revolved relative to the Sun in one cycle per year) of the Earth together in a single unit. Of course, the rotation of the Earth can be expressed by using a revolution unit to show the state of the Earth revolving relative to the Sun, which can be driven by a separate driving unit, but that is not realized in a single unit.

Furthermore, it has no description about a globe, which disclosures the revolution of the Planets relative to the Sun in a single globe apparatus for showing the rotation and the revolution of the Earth.

SUMMARY OF THE INVENTION

Accordingly, it is an object of the present invention to provide a globe apparatus capable of realizing the rotation and revolution of the Earth through a single globe.

It is another object of the present invention is to provide a globe apparatus for showing the revolution of the Planets relative to the Sun in a single globe for showing rotation and revolution.

Additional advantages, objects, and features of the invention will be apparently understood through the descriptions of the following embodiments.

According to an aspect of the present invention, there is provided a globe apparatus for showing rotation and revolution simultaneously. The apparatus include: a base to which one end of at least one support rod is fixed and one end of a revolution axis is rotatably fixed; a support arm fixedly coupled with the support rod; an Earth globe rotatably coupled with the support arm at two confronting points of the Earth globe with an inclination, and rotating; and a revolution unit placed inside the Earth globe and revolving relative to the two confronting points with coupled with the revolution axis, and showing day and night separately according to the rotation of the Earth globe.

Preferably, the Earth globe rotates with gear-coupled with a rotation axis rotated by a driving motor.

The globe apparatus of the present invention may further include an inferior planet revolution orbit unit which is provided at the center of the base, and includes an orbit of the Earth revolving with gear-coupled with the revolution axis and having a model of the Earth. Also, the inferior planet revolution orbit unit may include a model of the Sun at its center, an orbit of the Mercury including a model of the Mercury, and an orbit of the Venus including a model of the Venus around the model of the Sun and inside the orbit of the Earth, the orbit of the Mercury, the orbit of the Venus, and the orbit of the Earth revolving individually.

Preferably, the globe apparatus of the present invention may further include a display which is installed on the base, and displays the information transmitted from a user computer related with the rotation location of the Earth globe and the revolution location of the revolution unit.

The revolution unit includes: a disc-shaped day-and-night division plate spaced apart by a constant interval from the internal surface of the Earth globe; a coaxially cylindrical-shaped housing integrally formed with a lower part of the day-and-night division plate, and having a gear body therein, the gear body being coupled with a revolution gear of the revolution axis; an optical source provided on both sides of a center of the day-and-night division plate; and a bearing unit provided on uppermost and the lowest ends of the day-and-night division plate, and applying pressure to the inner surface of the Earth globe to function as a rotation pivot of the revolution unit.

Preferably, the support arm has an inner space for a power line and a control line, and the Earth globe has an inner space of a shell of the Earth globe which a location indicating lamp is provided in, and the power line and the control line are extended into.

In another aspect of the present invention, a globe apparatus for showing rotation and revolution includes: a base to which a first support rod and a second support rod accommodating a rotation axis therein are fixed, and to which one end of a revolution axis is rotatably fixed; a ring-shaped support arm fixedly coupled to the first support rod and the second support rod; an Earth globe rotatably coupled with the support arm at two confronting points with an inclination, and rotating on the rotation axis; a revolution unit placed inside the Earth globe and revolving relative to the two confronting points with coupled with the revolution axis, and showing day-and-night state of the Earth globe separately according to the rotation of the Earth globe by using an optical source; and an inferior planet revolution orbit unit installed at the center of the base, and having a model of the Sun at its center, an orbit of the Mercury including a model of the Mercury, an orbit of the Venus including a model of the Venus, and an orbit of the Earth including a model of the Earth around the model of the Sun, the orbit of the Mercury, the orbit of the Venus, and the orbit of the Earth revolving independently and located closely with each other.

In another aspect of the present invention, a globe apparatus for showing rotation and revolution includes: a base to which one end of at least one support rod is fixed and one end of a revolution axis is rotatably fixed; a ring-shaped support arm fixedly coupled to the support rod; an Earth globe rotatably coupled with the support arm at two confronting points of a south pole and a north pole with an inclination, and rotating; a revolution unit placed inside the Earth globe and revolving relative to the two confronting points with coupled with the revolution axis, and showing day-and-night state of the Earth globe separately according to the rotation of the Earth globe by using an optical source; and a driving unit being coupled with the Earth globe at the north pole of the Earth globe, and having a driving motor provided therein, a motor axis of the driving motor being coupled with the north pole only of the Earth globe.

In another aspect of the present invention, a globe apparatus for showing rotation and revolution include: a base to which one end of at least one support rod is fixed and one end of a revolution axis is rotatably fixed; a support arm fixedly coupled to the support rod; an Earth globe rotatably coupled with the support arm at two confronting points of the Earth globe with an inclination, and rotating; a revolution unit placed inside the Earth globe and revolving relative to the two confronting points with coupled with the revolution axis, and showing day and night separately according to the rotation of the Earth globe; and an inferior planet revolution orbit unit installed at the center of the base, revolving with gear-engaged with the revolution axis, and having an orbit of the Earth including a model of the Earth, wherein the Earth globe is structured to show the state of the Earth in a specific date as the same as that of the Earth corresponding to the specific data along the orbit of the Earth by separating the revolution axis from a toothed gear of the orbit of the Earth, rotating the orbit of the Earth to locate the model of the Earth at the specific data along the orbit of the Earth, and coupling the separated revolution axis with the orbit of the Earth.

Preferably, the inferior planet revolution orbit unit is figured that a model of the Sun is placed at its center, and an orbit of the Mercury including a model of the Mercury, and an orbit of the Venus including a model of the Venus are placed to revolve individually around the model of the Sun and inside the orbit of the Earth; and days in a year unit, dates, divisions of the year in the lunar calendar, and a revolution cycle are marked on the base along the orbit of the Earth, and the locations changes of the Mercury and the Venus according to the day of the Earth based on the revolution cycle are indicated.

In addition, optical sources are provided inside the model of the Sun, the model of the Mercury, the model of the Venus, and the model of the Earth to emit light at night.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
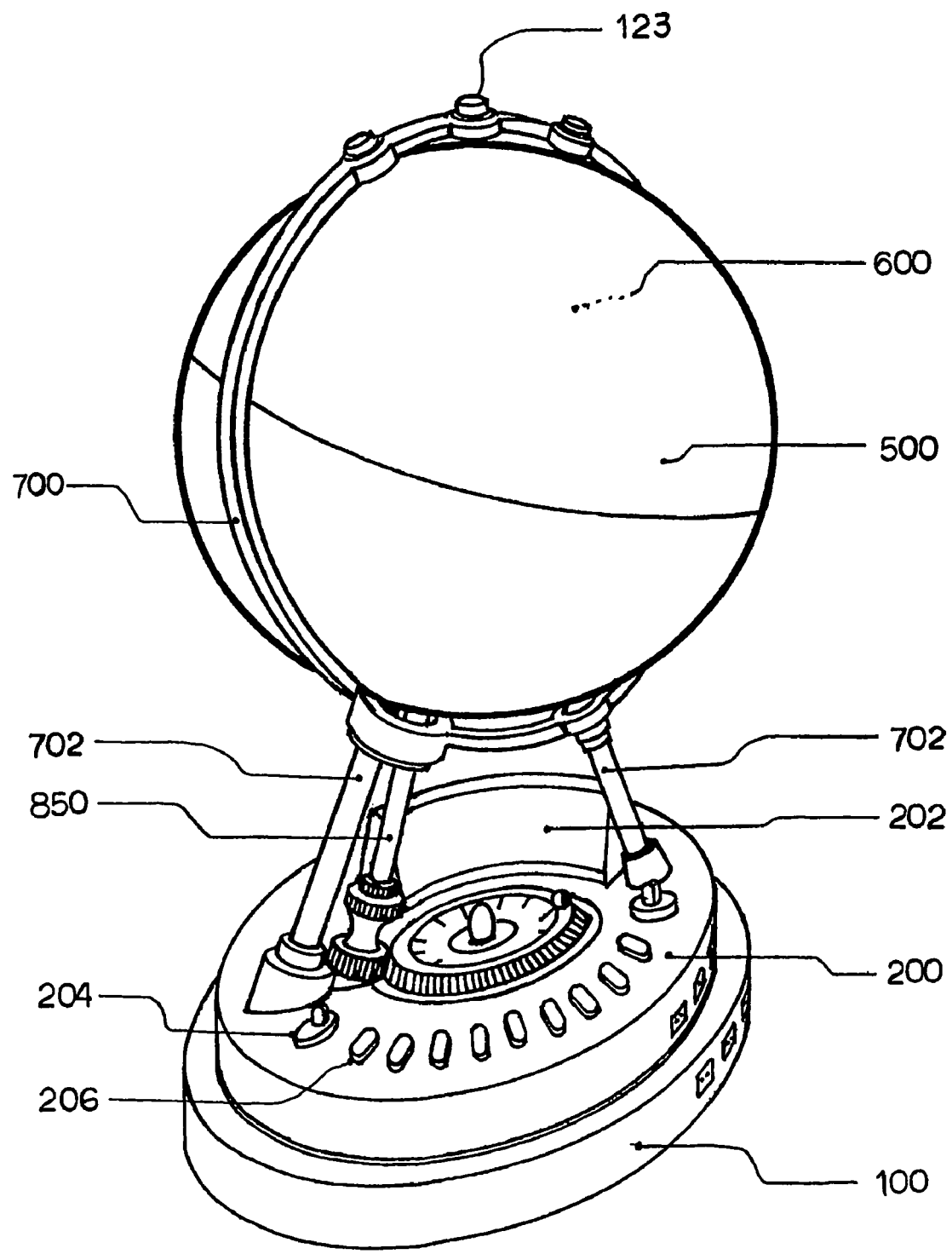
FIG. 1 is a perspective view of an Earth globe apparatus of the present invention.

FIG. 1 is a perspective view of an Earth globe apparatus of the present invention.

The Earth globe apparatus is figured to include a base 200 having a driving unit and a power supply unit there inside, for supporting various support rods or a driving axis, a revolving Earth globe 500, a support arm 700 for supporting the Earth globe 500 to be rotatable, and a revolution unit 600 installed inside the Earth globe 500.

Figure 2:
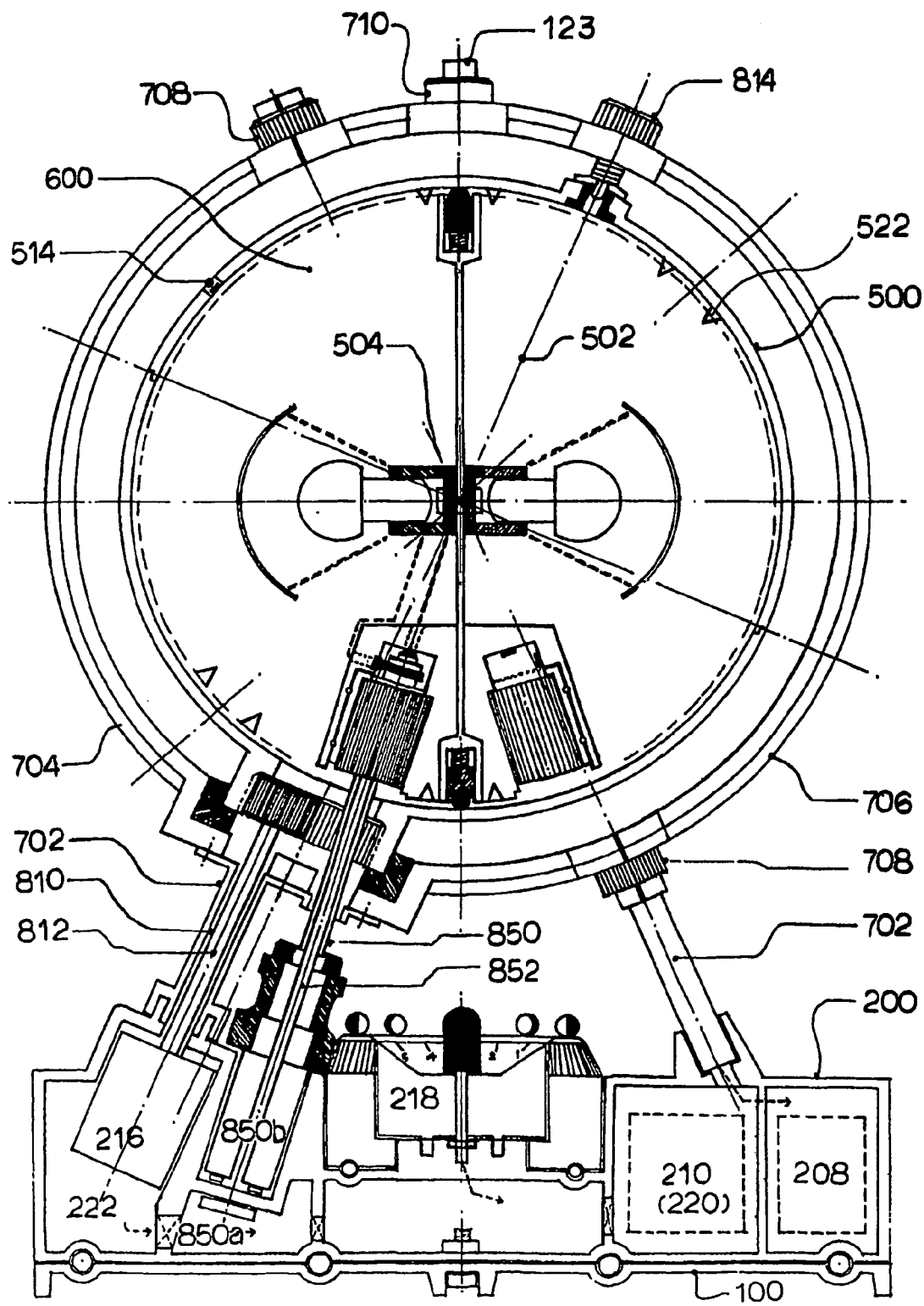
FIG. 2 is a main sectional view of an Earth globe apparatus of one embodiment of the present invention.

Referring to FIGS. 1 and 2, a support plate 100 is rotatably placed under the base 200, for enabling the overall Earth globe apparatus to rotate. Since the base 200 is rotatable relative to the support plate 100, the Earth globe apparatus can be observed from various directions.

On the surface of the base 200, there are installed a display 202, function switches 206 having various functions, and a light-emitting lamp 204 for showing the driving of the Earth globe apparatus and its operational state. The various functions of the function switches 206 will be described below. In addition, even though it is not described in the drawings, a path for the input/output of various power lines or control lines is provided on the side of the base 200.

There are installed a power supply unit 208 and a controlling interface unit 210 inside the base 200 with comparted. Also, there is a room 222 for placing ends of a rotation axis 810 and a revolution axis 850 inside the base 200. The room 222 also has a rotation axis driving motor 216 there inside. The revolution axis 850 has a revolution axis weight bob 850b attached on its end and is rotatably coupled with the base 200 by a fixing screw 850a.

The power supply unit 208 supplies the power to a driving motor 216 fixed on the end of the rotation axis 208, a lamp of the revolution unit 600 to be described below, a location indicating lamp placed on the surface of the Earth globe 500, planets, and a light-emitting lamp 204. In addition, the controlling interface unit 210 is connected to a separate computer system connectable with Internet to receive various information related with the current state of the Earth that rotates and revolves and to display on the display 202.

The display 202 displays various data on its screen, for example, the 24 divisions of the year in the lunar calendar, various information of the Earth, and locations of planets and stars on the universe as well as the current time, month, day, date, temperature, humidity and the time of ebb and full tide around the countries, etc. That is, the Earth globe apparatus of the present invention can be used as a digital time clock at normal time, and it allows informing where the Earth is located relative to the Sun at current time by flickering of the light-emitting lamp in the corresponding area. If other kind of information is necessary, it receives the information through the Internet from a user computer connected to the controlling interface unit 210 by the function switches 206 to display the information or output the information via a voice output unit 220.

Referring to FIG. 2, the support arm 700 placed a little apart from the surface of the Earth globe 500 and enabling the Earth globe 500 to rotate is figured to have a lower support arm 704 and a upper support arm 706, and each of the support arms 704, 706 are thread-engaged by a fixing nut 708 at their ends to form a circle-shaped support arm 700.

A leg 702 includes a first leg 702 and a second leg 702, and the first leg-702 is fixed to the base 200 at its one end, and is connected to the fixing nut 708 at its the other end, the fixing nut 708 being placed on the lower side of the support arm 700. The second leg 702 includes the rotation axis 810, and is fixed to the base 200 at its one end and supports the support arm 700 at its the other end.

The support arm 700 and the legs 702 have a hollow state in their inside, and various control lines and power lines use the hollow inside as paths, and particularly, the support arm 700 may have scales formed thereon for various purposes, or have various additional units provided thereon.

Figure 4:
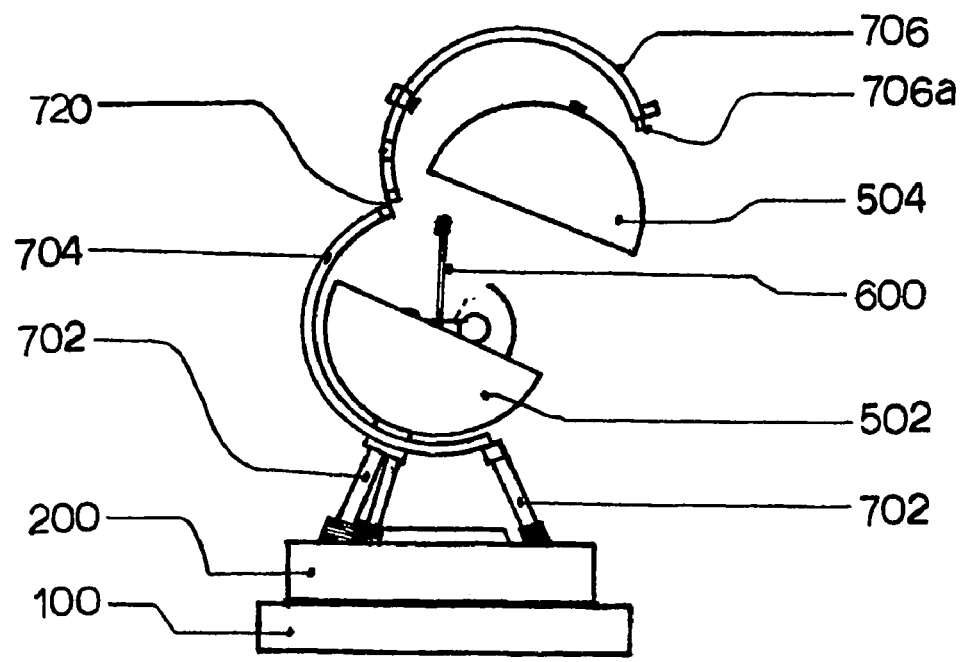
FIG. 4 is an explanation view to illustrate the method of coupling an Earth globe with a support arm.
Figure 4:
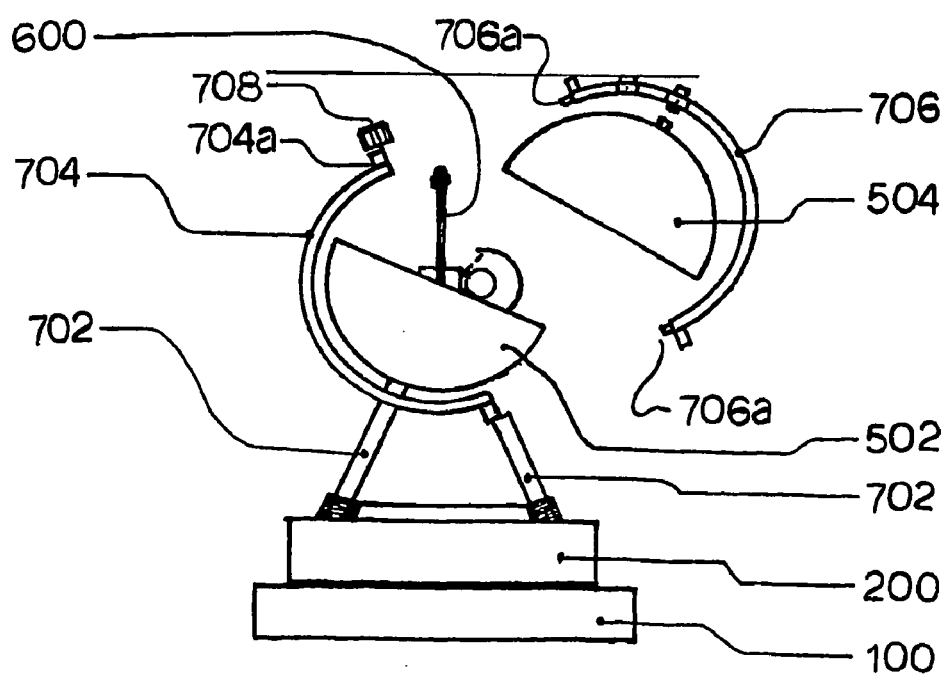

The Earth globe 500 is rotatably coupled with the support arm 700, and its coupling method is described with reference to FIG. 4.

That is, the lower support arm 704 and the upper support arm 706 are fixed by a hinge 720 at their one ends, and they can be separated and open at their the other ends with the hinge 720 fixed, and the Earth globe can be inserted and coupled with the open support arms 704, 706. Or, the ends where the lower support arm 704 and the upper support arm 706 meet can be completely open, and the Earth globe 500 is inserted there between, and the ends of the lower support arm 704 and the upper support arm 706 are thread-engaged by fixing nuts 708.

The lower support arm 706 and the upper support arm 704 have coupling grooves/coupling protrusions 704a, 706a on the both ends of the support arms 706, 704, and by the coupling grooves/coupling protrusions 704a, 706a, the support arms 706, 704 are firstly coupled, and fixed by the fixing nuts 708 more tightly.

Figure 5:
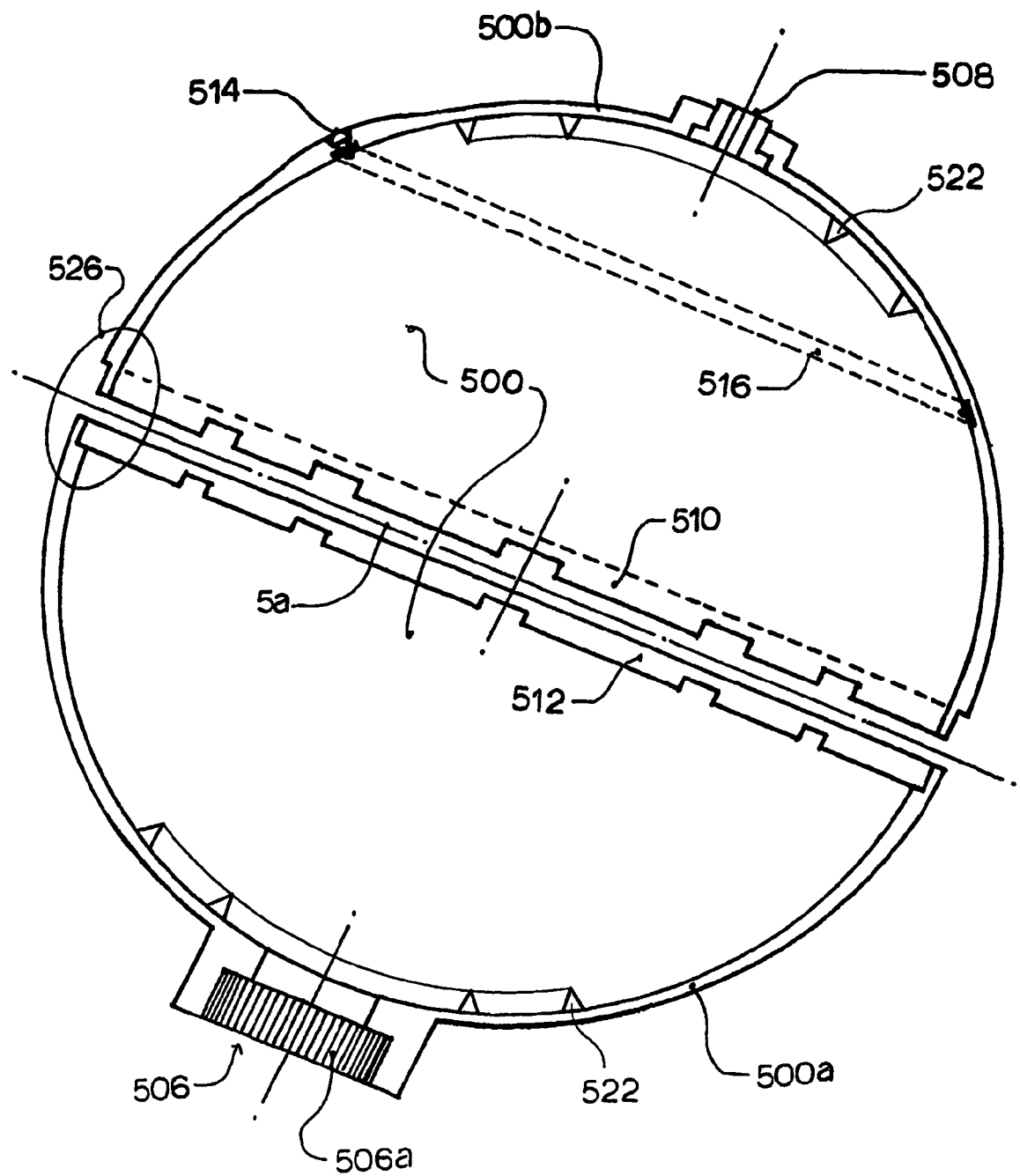
FIG. 5 is an exploded sectional view of the Earth globe of the present invention.

FIG. 5 is an exploded sectional view of the Earth globe of the present invention.

As illustrated in the drawing, the Earth globe 500 is formed by coupling two separated hemispheres, i.e., a southern hemisphere 500a, and a northern hemisphere 500b, which have recessed grooves 510, 512 on their interfaces where they meet to fit into each other and are coupled with each other with male-female meshing. The coupling by the above shapes is necessary to make very tight because rotatory strength is transferred from one hemisphere to the other hemisphere.

On the south pole of the southern hemisphere, there are provided a cylindrical-shaped protrusion 506 being rotatably contacted with the support arm 700, a through hole being placed inside the cylindrical-shaped protrusion 506 with a diameter enough to allow the insertion of the rotation axis 810 and the revolution axis 850 together and communicating with the inside of the Earth globe 500, and a gear teeth 506a being placed on the side wall of the through hole and gear-coupled with a rotation gear which is coupled with the end of the rotation axis 810.

In addition, on the outer surface of the Earth globe 500, there is provided a geographic map, and there is installed a location indicating lamp 514 for showing the location on the map. A conductive line 516 for applying power to the location indicating lamp 514 is provided on the internal side of the Earth globe. For the installation of the conductive line 516, the shell of the Earth globe 500 can be made with a predetermined thickness or with a cavity therein. An optical fiber line for laser or plastic conductor can be used as the conductive line 516, and by using the materials, the conductive line 516 can be displaced freely and arbitrarily, which will be described below.

In addition, there are provided a pair of guide 522 on the internal surface of the Earth globe 500 with protruded there from for supporting one end of the revolution unit to be described below and guiding the revolution unit. The guide 522 helps a day-and-night division plate of the revolution unit not to deviate beyond the predetermined orbit when the day-and-night division plate rotates relative to the south-pole and the north-pole.

Figure 20:
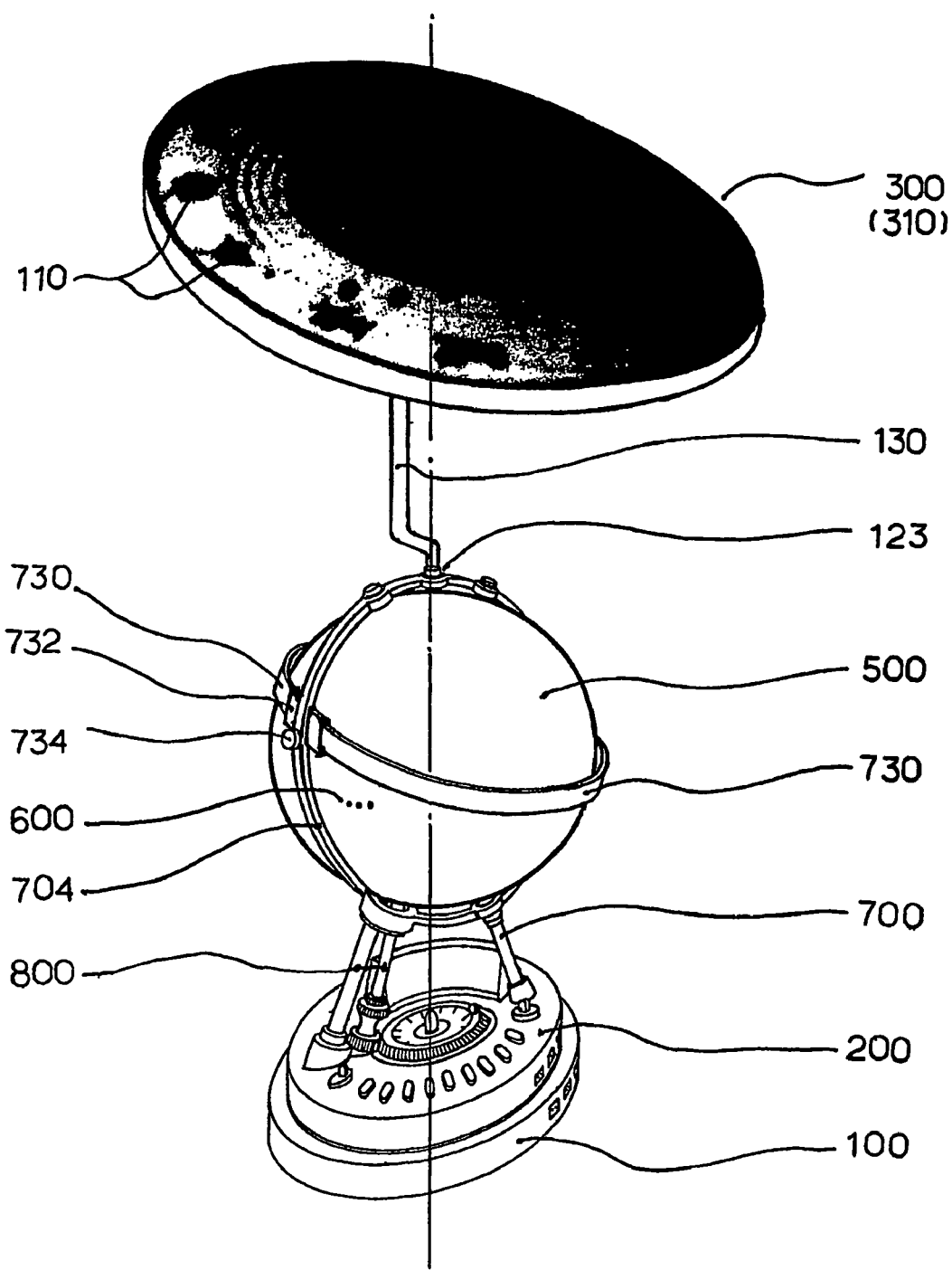
FIG. 20 is a perspective view of the state that the solar system is connected with the Earth globe of the present invention.

In addition, an auxiliary part-connecting unit 123 is provided on the top of the upper support arm 706, and lunar and solar systems 300 can be connected thereto as shown in FIG. 20.

In the meantime, a pivot unit 508 is provided on the north-pole area of the northern hemisphere so that the Earth globe 500 and the support arm 700 are rotatably connected.

Figure 8:
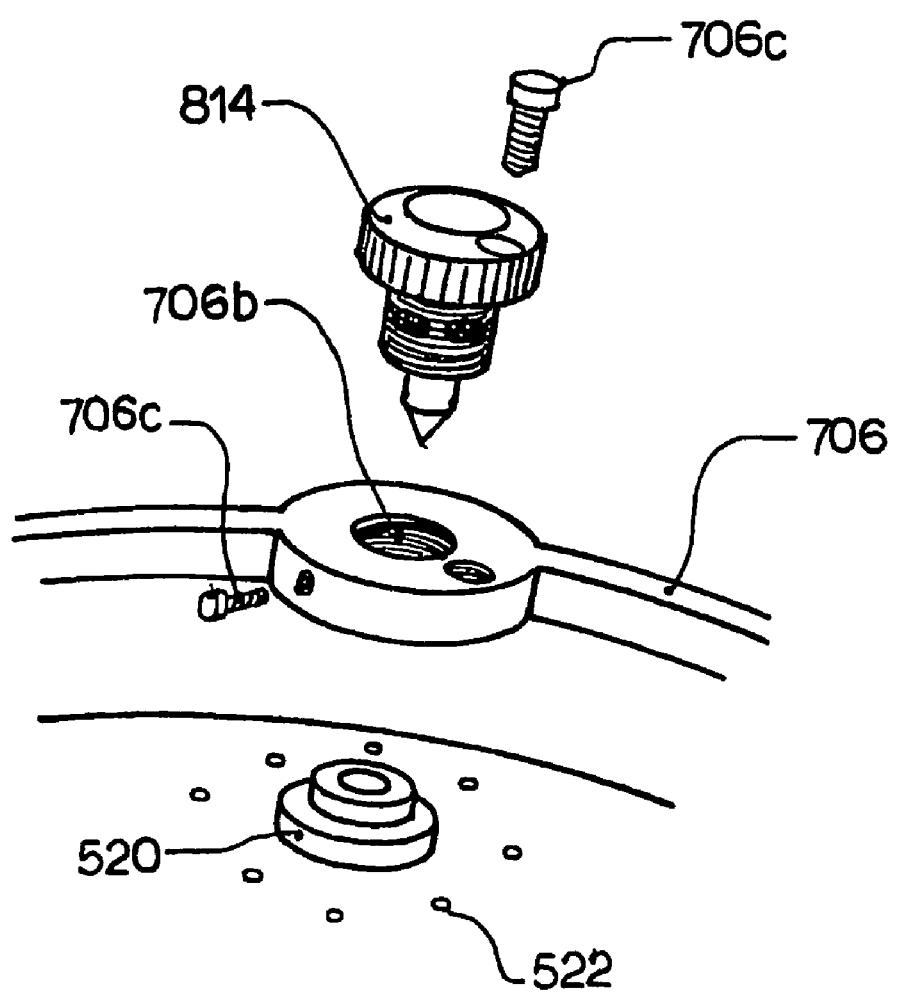
FIG. 8 is a perspective view of the coupling relation of the support arm and the upper part of the Earth globe.

Referring to FIG. 8, the pivot unit 508 includes a support bolt 814 which is thread-engaged with a north-pole hole 706b of the upper support arm 706. The end of the support bolt 814 is acicular-shaped with sharpness, which is connected with a receiving protrusion 520, which is formed on a corresponding portion on the surface of the Earth globe 500 with protrusion. Since the pressure which the support bolt 814 applies to the Earth globe 500 should be uniform, the pressure of the support bolt 814 is first determined, and lateral/longitudinal pins 706c couple the support bolt 814 and the support arm 700 in the lateral direction and in the longitudinal direction to maintain the uniform pressure and prevent the rotation of the support bolt 814.

In the meantime, a plurality of heat-emitting holes 522 are provided around the receiving protrusion 520 on the Earth globe 500 to emit the heat generated from the lamps inside the Earth globe 500.

Figure 6:
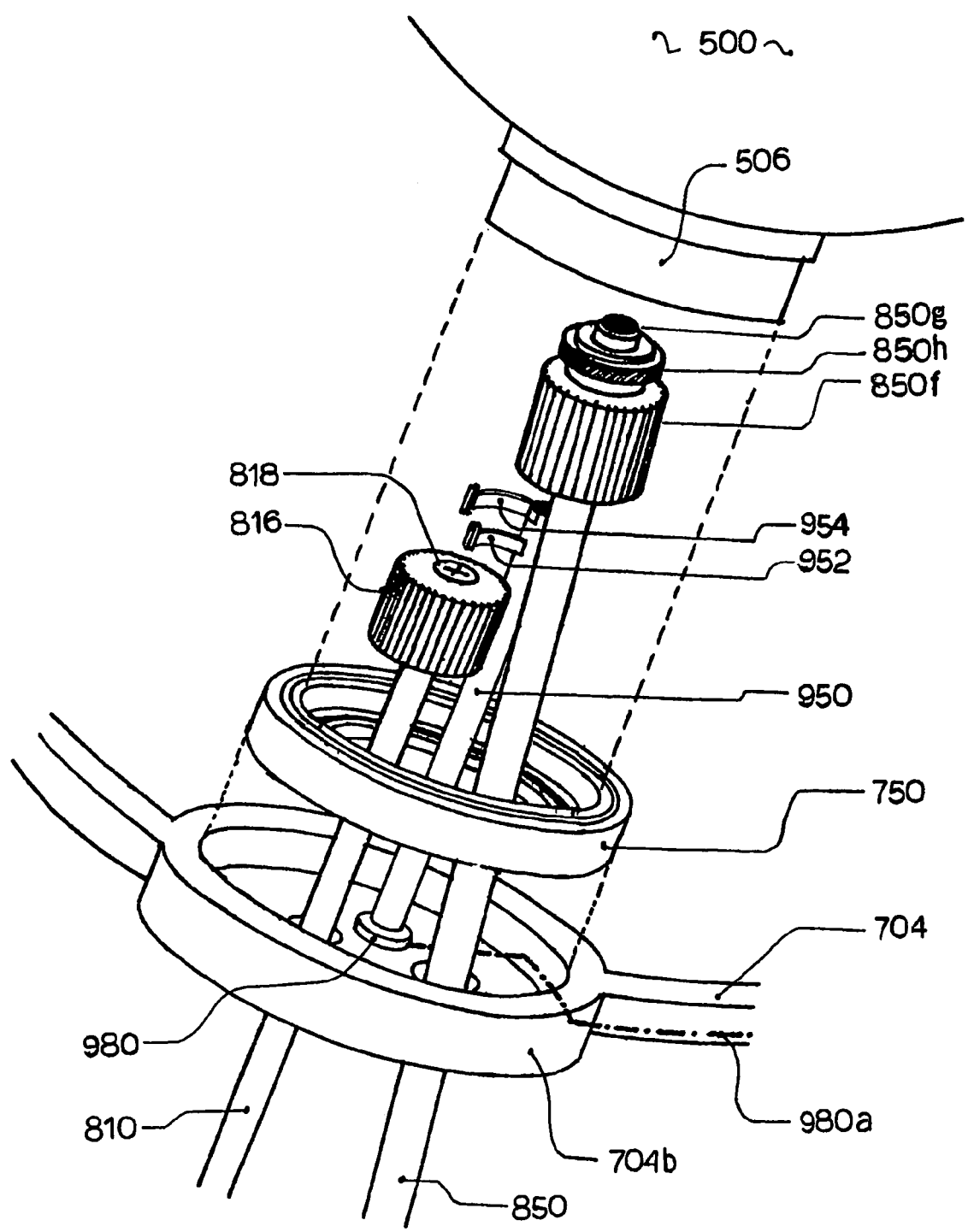
FIG. 6 is an explanation view of the coupling relation of the support arm and the lower part of the Earth globe, and the penetrating state of a rotation axis and a revolution axis through the support arm.
Figure 7:
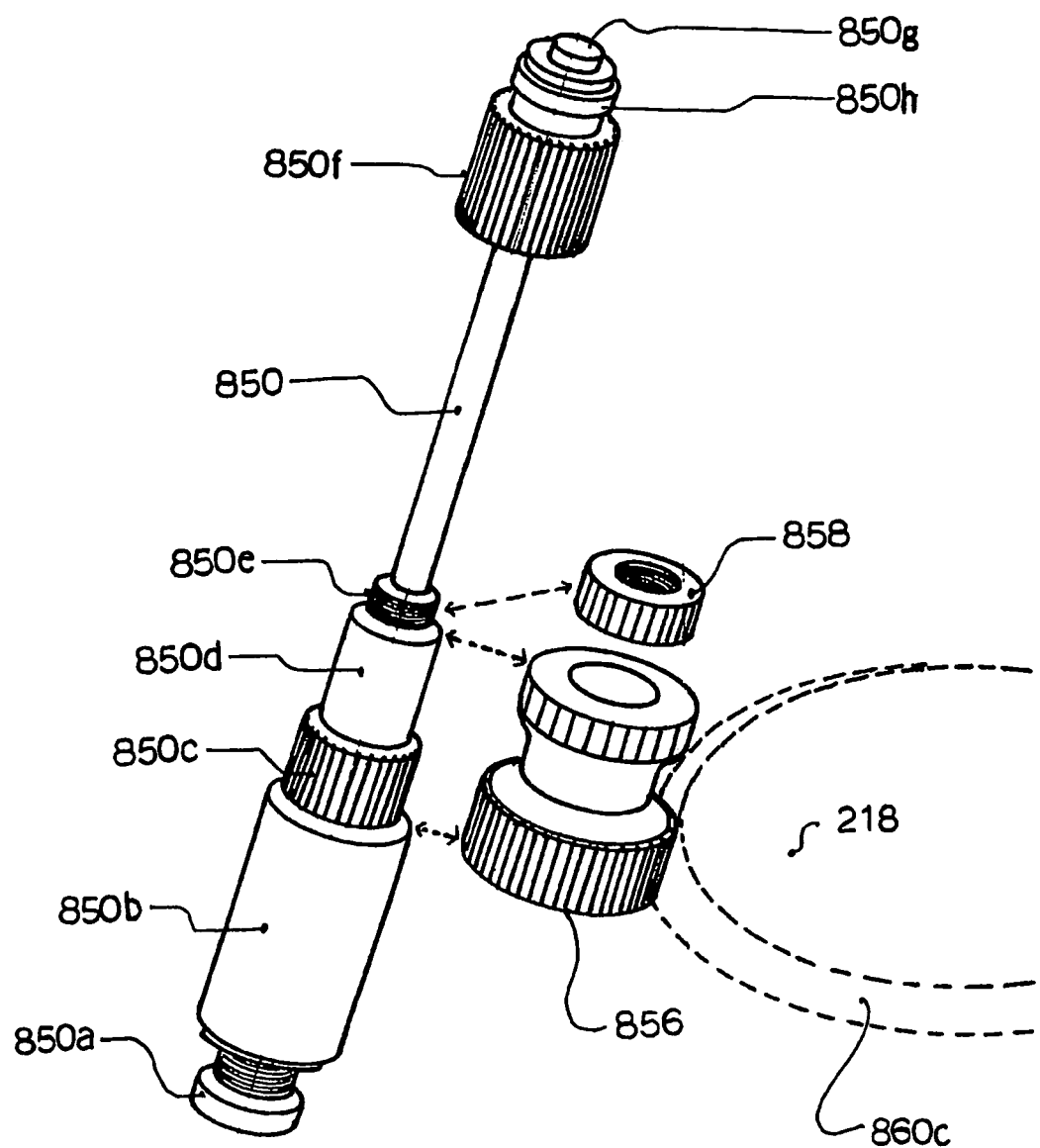
FIG. 7 is an exploded perspective view of the structure of the revolution axis.

FIG. 6 is a perspective view of the coupling state of the support arm and the rotation axis and the revolution axis, and FIG. 7 is a detailed perspective view of the revolution axis.

As described above, a cylindrical-shaped protrusion 506 formed on the south pole area of the southern hemisphere 500a is fit into a rotation ring 750 having a ball-bearing therein, and the rotation ring 750 is fit into a support holder 704b formed on the lower support arm 704. Therefore, the Earth globe can be easily and smoothly driven to rotate with a sloop of 23.5° relative to the vertical axis and the weight of the Earth globe functioning as eccentricity. In addition, on the bottom of the support holder 704b, there are provided through holes through which the rotation axis 810, the revolution axis 850, and a conductive rod 950 to be described below penetrate. FIG. 6 illustrates that the conductive rod 950 and the conductive line 980a, which is installed along the inside of the lower support arm 704, are connected.

In addition, a rotation gear 816 is fixed on the upper side of the rotation axis 810 by a screw 818. The rotation gear 816 is meshed with a gear teeth 506a on the internal side of the cylindrical-shaped protrusion 506 formed on the south pole area of the Earth globe 500 so as to transmit the rotation force of the rotation gear 816 to the Earth globe.

The rotation gear 816 is rotated by the rotation axis driving motor 216, and is controlled to rotate once per day by a driving motor controlling unit (not shown), and the driving motor 216 is possibly structured to drive with engaged with, for example, a timer system in the unit of a minute.

Figure 3:
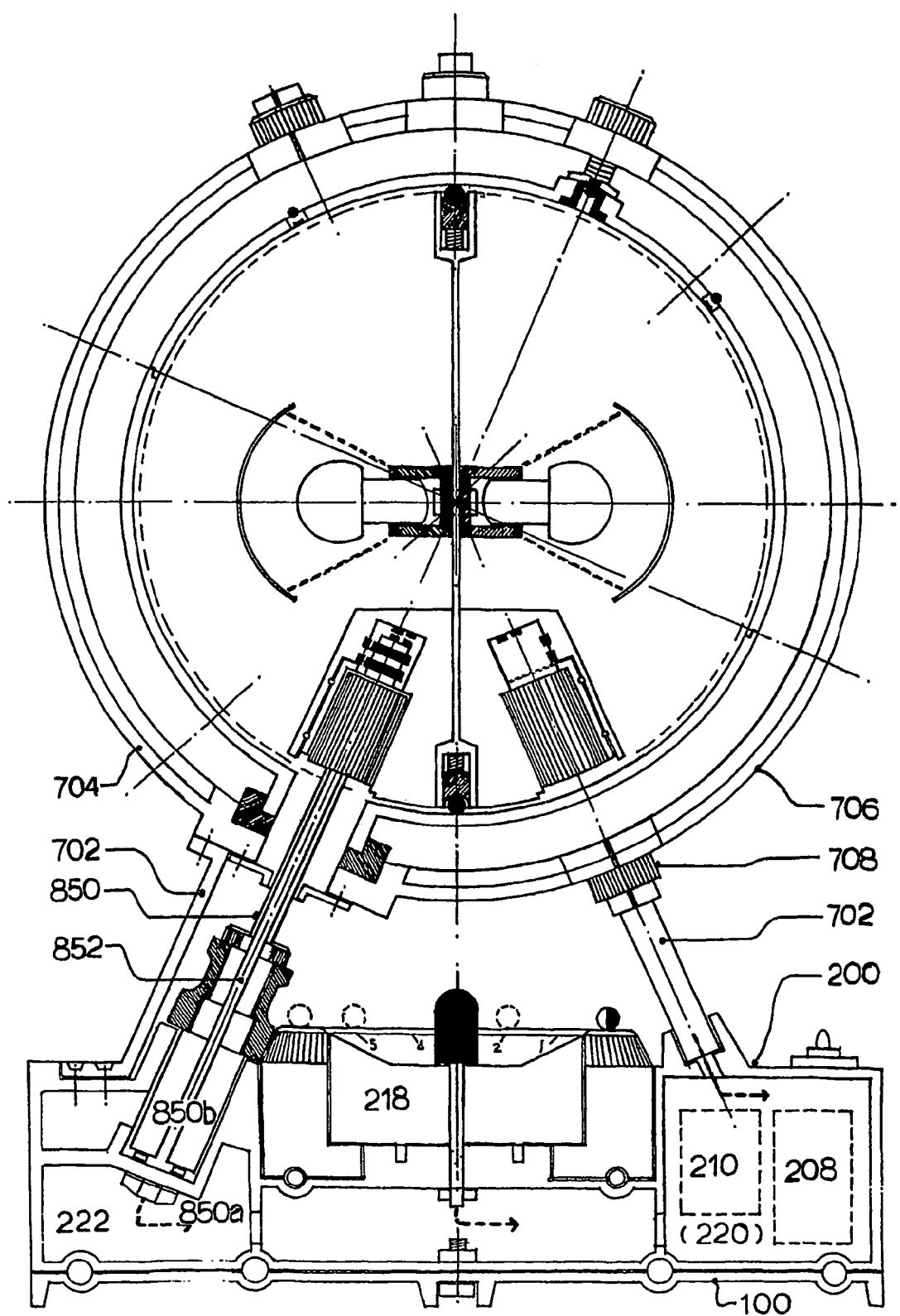
FIG. 3 is a main sectional view of an Earth globe apparatus of another embodiment of the present invention.

FIG. 6 illustrates the case where the rotation axis and the revolution axis are installed together like the case in FIG. 2, or by installing the revolution axis without the rotation axis illustrated in FIG. 3, the Earth globe can be driven by hand.

Referring to FIG. 7, the revolution axis 850 is figured in such a manner that its one end is rotatably fixed to the base 200 by the fixing screw 850a, and a revolution axis weight bob 850b is installed on its lower side to maintain a stable revolutionary operation. The revolution of the revolution axis 850 is actually made by hand, which is because the automatic structure of revolution of one cycle per year is inefficient and uneconomical.

A cylindrical-shaped knob 856 is used for the revolution of the revolution axis 850, and the revolution axis 850 has multiple steps 850c, 850d, 850e on its surface and is inserted into the cylindrical-shaped knob 856. Gear teeth are formed on the outer surface of the knob 856, and the knob 856 is fixed with the revolution axis 850 such that the fixing nut 858 is thread-engaged with the screw 850e of the multiple steps.

The revolution axis 850 has a revolution axis revolution gear 850f which is inserted into the Earth globe 500 and rotates the day-and-night division plate of the revolution unit.

In addition, in case of achieving the revolutionary motion by the motor driving, the revolution radius, the size of the gear teeth, and the number of the gear teeth should be determined so that the gear teeth formed on the outer surface of the knob 856, the gear teeth of the revolution axis revolution gear 850f, the gear teeth 860c of the orbit of the Earth coupled with the gear teeth of the knob, and the standing gear teeth of the day-and-night division plate are rotated once per year.

In addition, power supply terminals 850g, 850h for applying a power to the revolution units are installed on the top of the revolution axis 850 to be connected with the power lines extended through the hollow tube inside the revolution axis 850.

Described above, since the revolution axis is just rotated once per year, and users do not use the revolution axis that often, it can be used for educational purposes. The Earth globe and the Earth placed in the revolution orbits for planets should be matched according to the actual situations of a specific time such as a date of the year, or 24 divisions of the year. That is, the revolution axis 850 needs to be newly controlled and coupled again after loosening the fixing nut 858 and raising the knob 856 by hand to separate from the Earth orbit gear teeth 860c.

In the meantime, as shown in FIG. 2, in case of rotating the Earth globe by power source, the rotation axis 810 and the revolution axis 850 do not correspond to the central line of the Earth globe, i.e., of connecting the south pole and the north pole. The reason of that is because the south-pole area has a rotation space of the Earth globe, and the rotation axis 810 and the revolution axis 850 are inserted into the space. Therefore, the rotation axis central line 812 should be aligned in parallel with the Earth central line, and the revolution axis central line 852 should be placed toward the Earth central point 504.

However, as shown in FIG. 3, in case of rotating the Earth globe by hand, the revolution axis 850 only is installed, and since the revolution axis central line 852 corresponds to the Earth central point 504, the revolution axis central line 852 is designed to correspond to the rotation axis central line 812.

Figure 9:
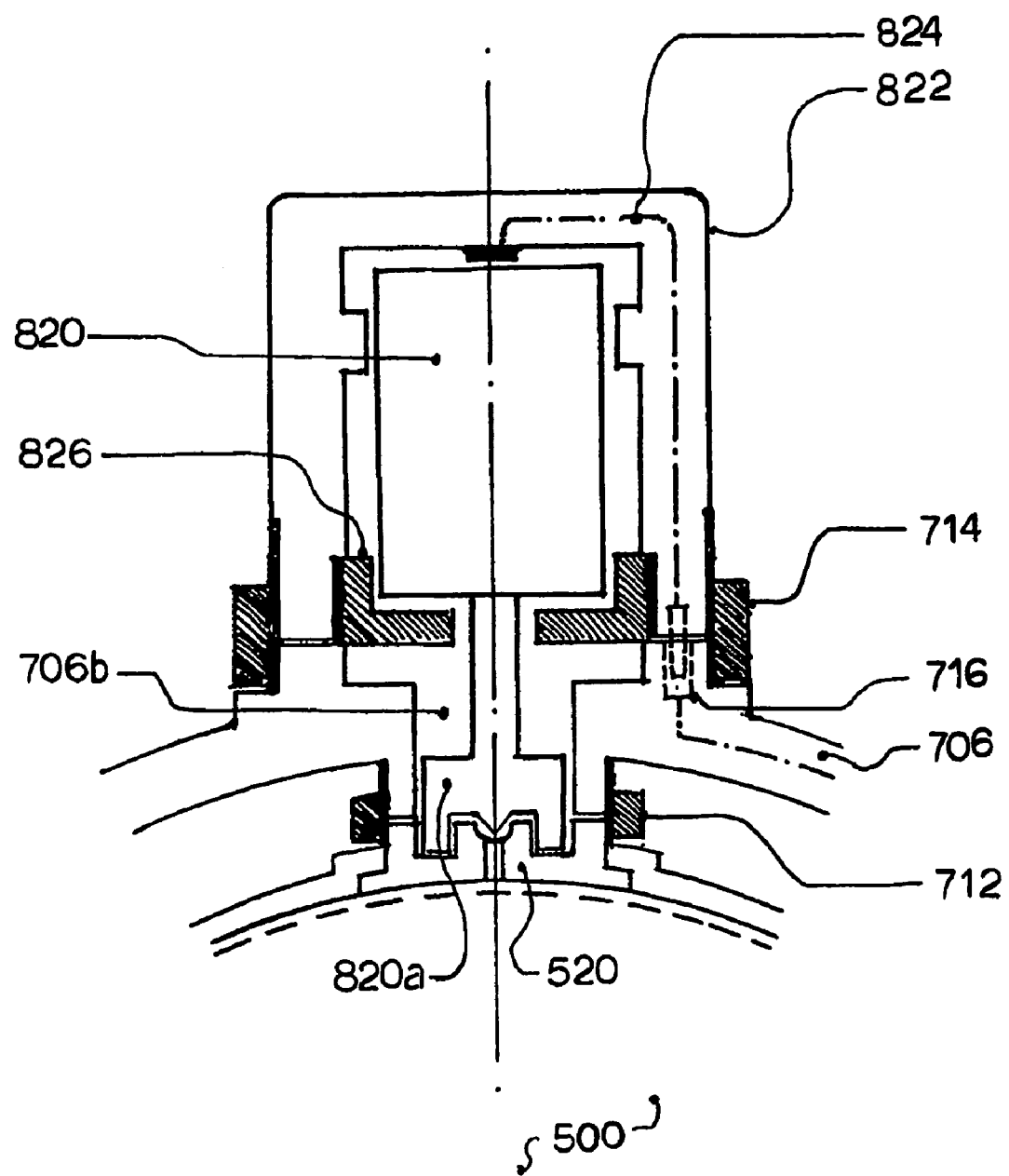
FIG. 9 is a sectional view of a driving unit for driving the Earth globe at the north pole of the Earth globe.

FIG. 9 is a sectional view of a driving unit for driving the Earth globe at the north pole of the Earth globe.

Since the rotation axis 810 and the revolution axis 850 are all installed together in case of driving the Earth globe by power source, the south pole area of the Earth globe 500 becomes narrow because of the two axes, and so, it has a problem of difficulty in explaining the south pole area to the students for the educational purposes, and in case of explaining to the users living in the south pole area of the Earth, it is sometimes necessary to rotate the Earth globe and turn the north pole down to turn the south pole up. In this case, by installing the driving unit for the rotation on the north-pole area, the installation space in the south-pole area can be reduced, and locations can be indicated on both of the south-pole and the north-pole.

First, the bracket 520 on the north pole of the Earth globe 500 are placed to be aligned with the through hole 706b on the support arm 706 at the central line, and by using a supplementary fixing ring 712, the bracket 520 and the upper support arm 706 are coupled.

Then, after a case 822, which includes a driving motor 820, a driving axis protruded out of the case, a rotation chuck 820a placed on the end of the driving axis, and a flow-preventive ring 826 placed adjacent to the opening, is placed such that the rotation chuck 820a and the bracket 520, a case-fixing ring 714 is turned around to fix to the upper support arm 706, and remove the supplementary fixing ring 712.

Therefore, the Earth globe 500 receives the rotation force of the driving motor 820 by the bracket 520 through the rotation chuck 820a to rotate itself.

The driving motor 820 receives the power source by the conductive line 824 extended to the case 822, and a connector formed on the end of the conductive line 824 and a connector formed on the end of the conductive line extended to the upper support arm 706 are coupled on the interface to be electrically connected.

Figure 10:
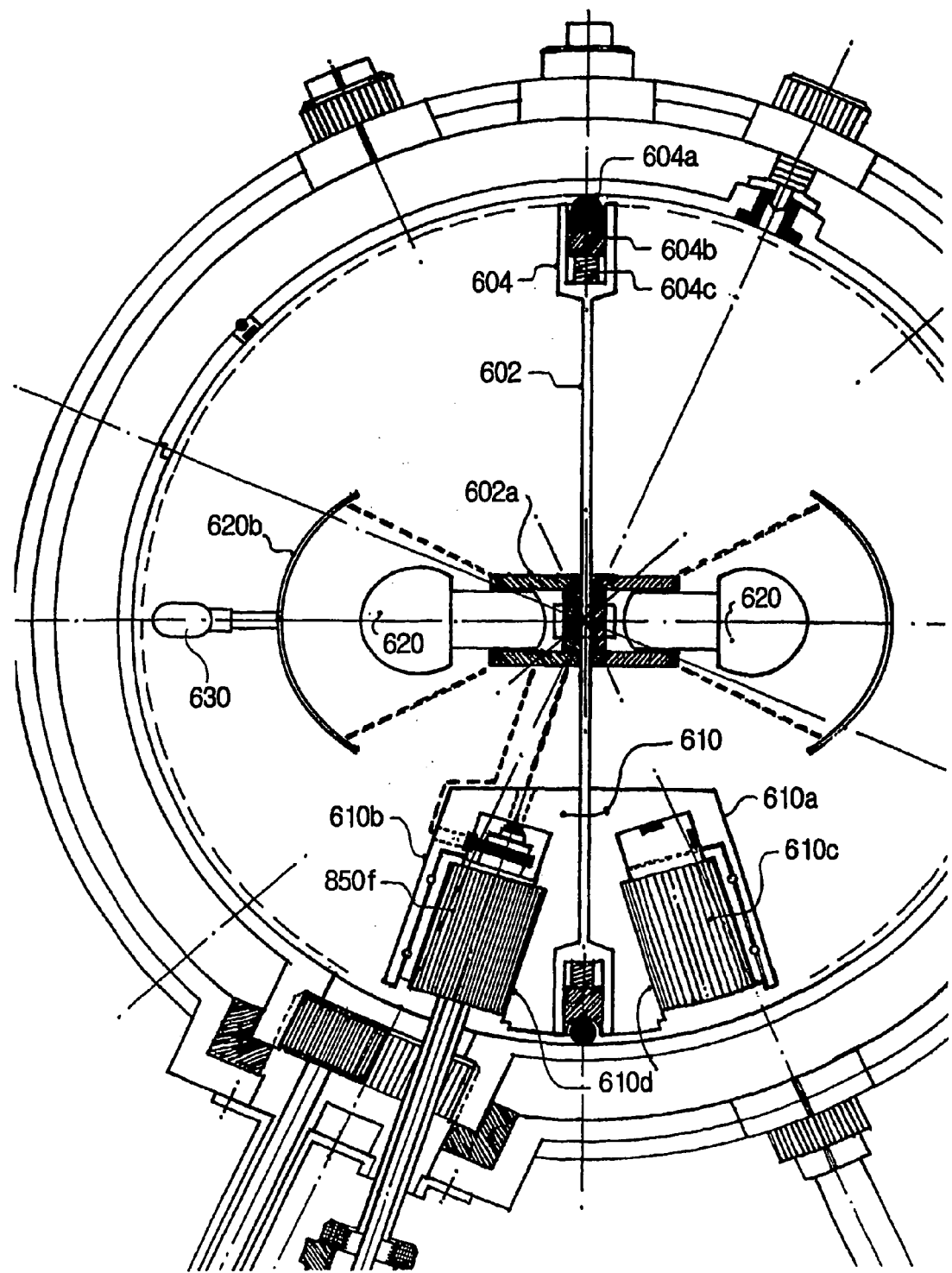
FIG. 10 is a sectional view of a revolution unit of one embodiment of the present invention.
Figure 10A:
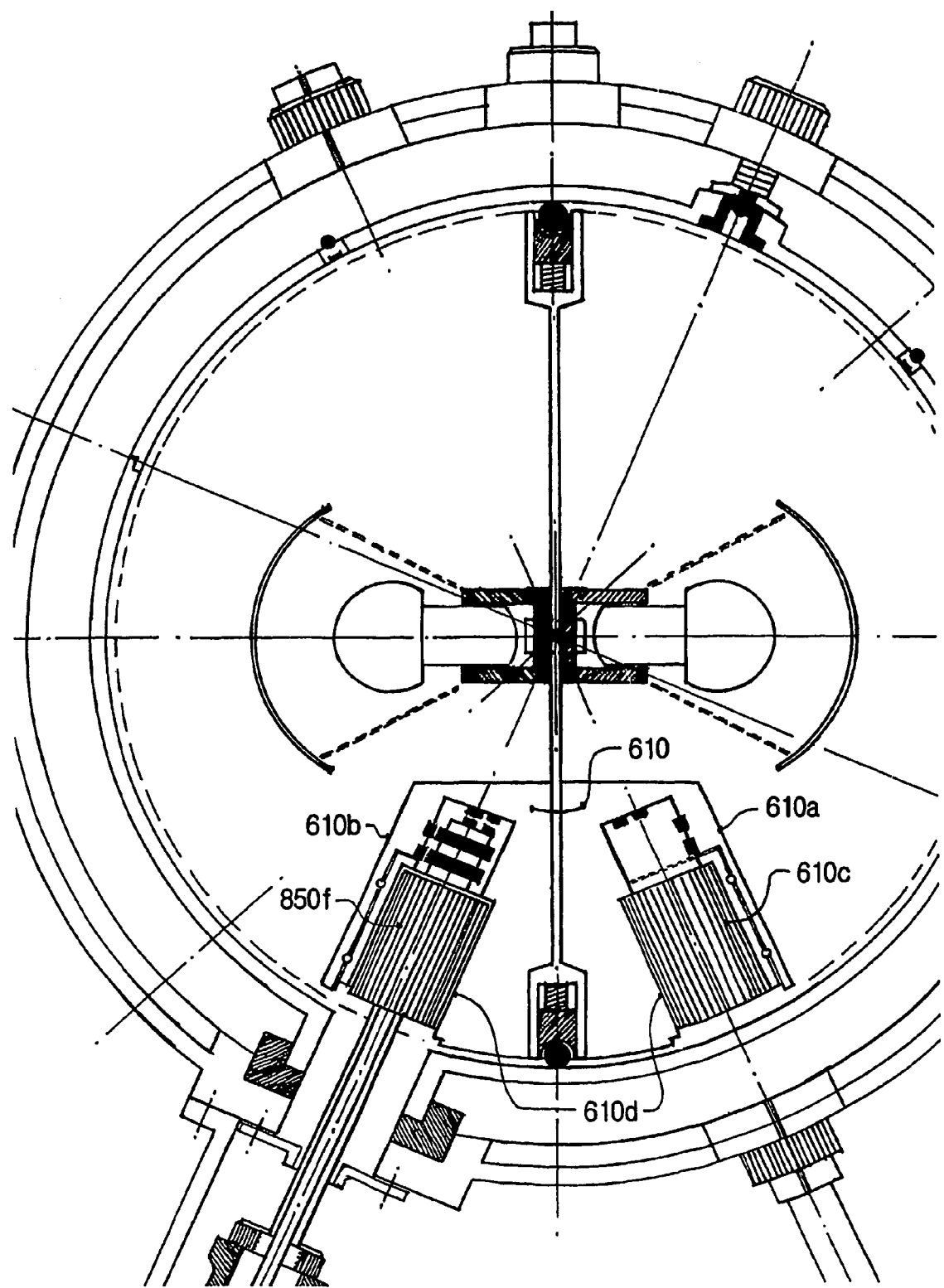
FIG. 10a is a sectional view of a revolution unit of another embodiment of the present invention.
Figure 11:
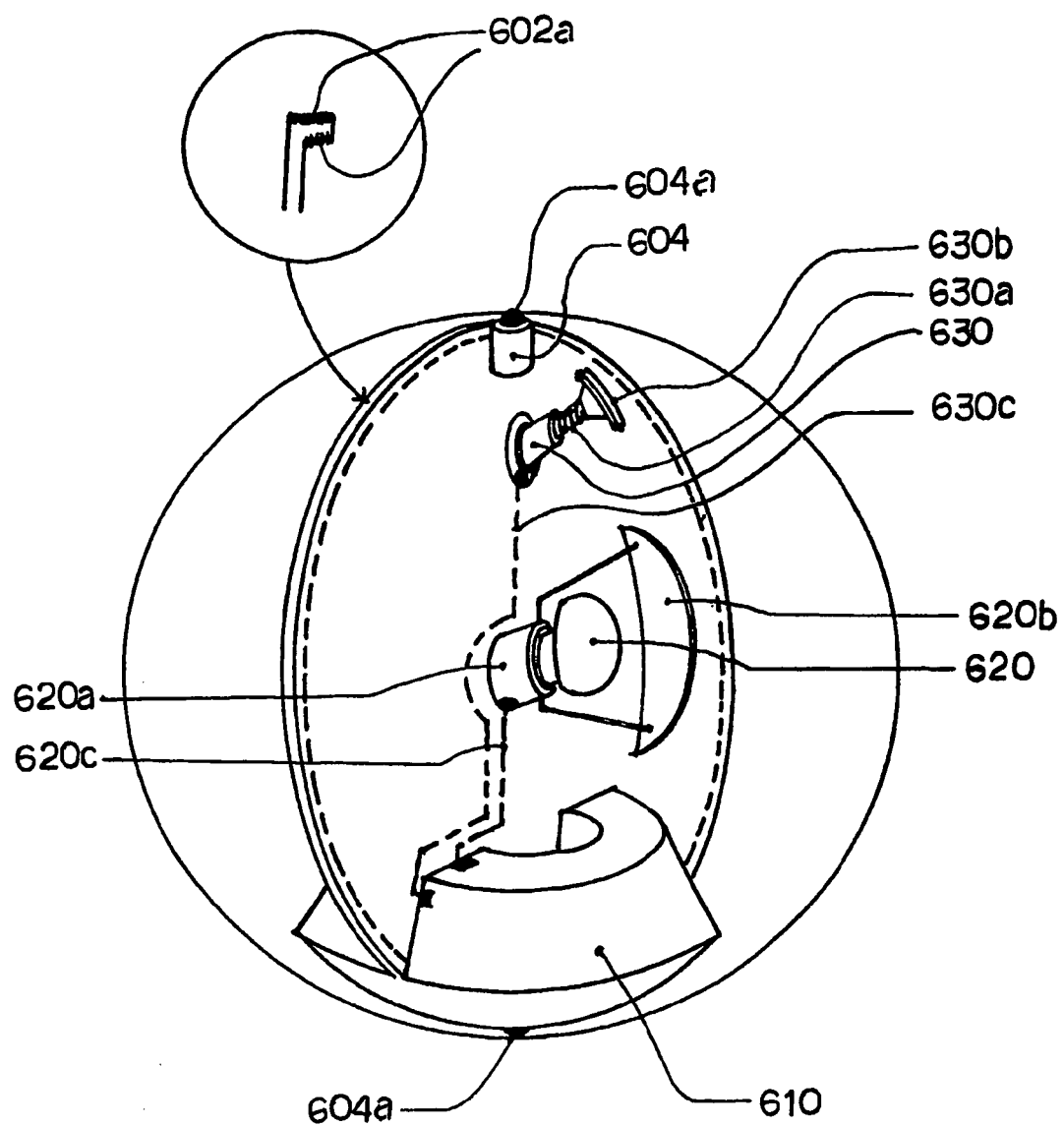
FIG. 11 is a side perspective view of the revolution unit.
Figure 12:
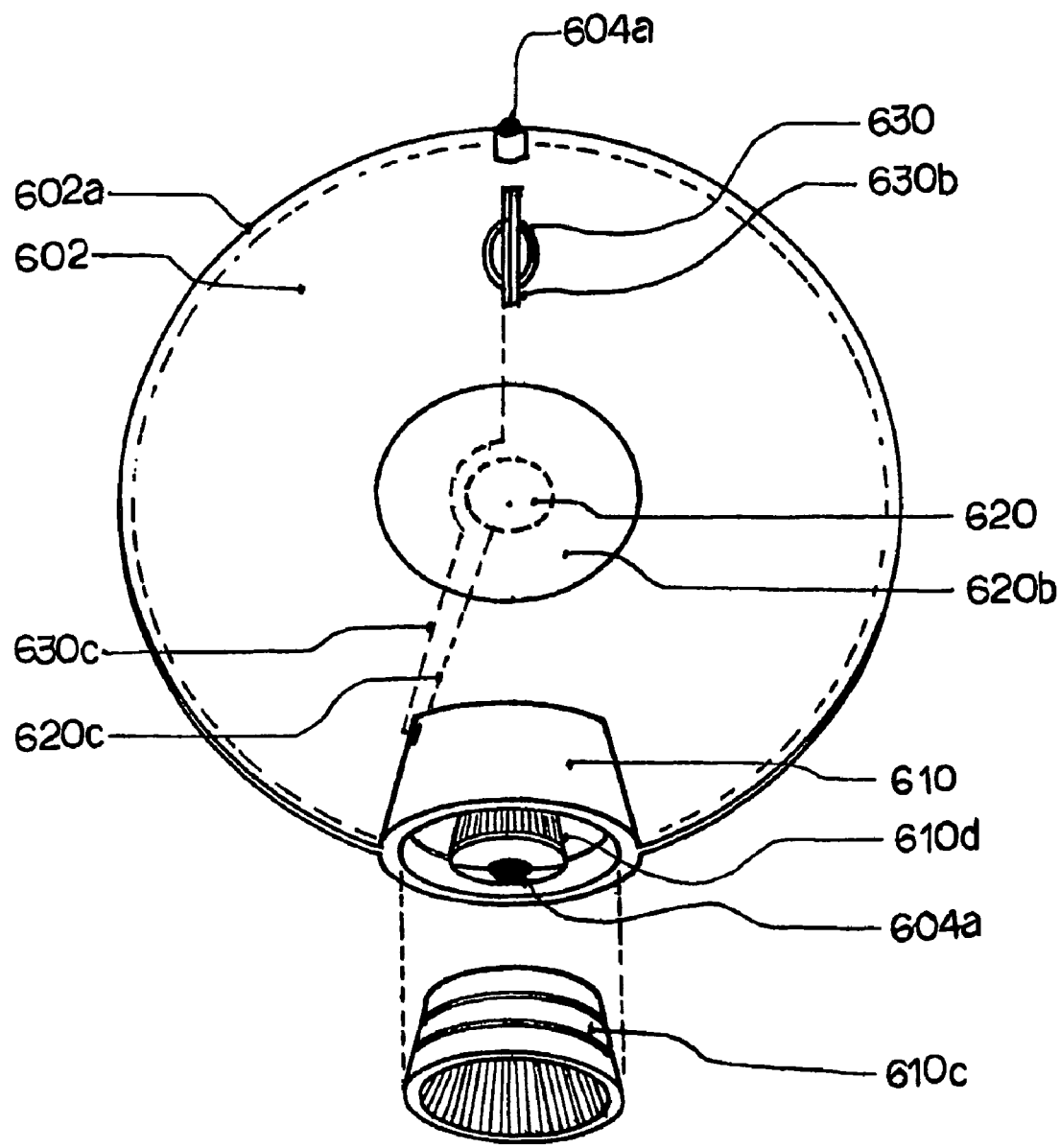
FIG. 12 is a bottom perspective view of the revolution unit.

FIGS. 10 to 13 illustrate the revolution unit employed on the present invention, FIG. 10 is a detailed sectional view of the day-and-night division plate, FIG. 10a is a view of a power supply structure of the revolution unit of another embodiment of the present invention, FIGS. 11 and 12 are a side view and a front perspective view of the day-and-night division plate respectively.

The day-and-night division plate 602 in the present invention is provided to show the revolution of the Earth around the Sun once per year inside the Earth globe, and it has a disk shape with a little smaller diameter than the inner diameter of the Earth globe 500 so that it rotates inside the Earth globe with a little distance away from the internal surface of the Earth globe 500.

Typically, there is provided an optical source on the both sides of the day-and-night division plate 602, and the day-and-night division plate 602 is figured to rotate with its highest point and the lowest point contacted with the internal surface of the Earth globe, and to rotate relative to the north pole and the south pole to form a predetermined-shaped circle at its traveling surface. Therefore, from the view outside the Earth globe, the above structure brings the effect that day and night are exchanged with a predetermined cycle by the optical source there inside.

The day-and-night division plate 602 is disc-shaped, and is spaced apart by a constant interval from the internal surface of the Earth globe 500, and as shown in FIG. 11, to prevent the light from the optical light source 620 formed on the both sides from coming out of the Earth globe, a bent-up part 602a is formed along its peripheral side, and black cloth, brush or sponge, etc. are attached thereto to absorb the light.

Cylindrical-shaped ball joints 604 are formed on the both ends of the uppermost and the lowest points of the day-and-night division plate 602 respectively, and an elastic member 604c, a magnet 604b, and a ball bearing 604a are placed sequentially. Therefore, the ball bearing 604a applies pressure to the inside of the Earth globe 500 by receiving pressure by the elastic member 604c, and makes a circular movement along the guide 522.

In addition, on the lower side of the day-and-night division plate 602, there is provide a coaxial cylindrical-shaped housing 610 is integrally formed for transmitting a driving force for the rotational movement of the plate and for functioning as the center of mass so that the plate could be stably rotated.

The housing 610, as shown in FIG. 12, is figured as a coaxial cylindrical-shape, and is protruded from the center of the day-and-night division plate 602 outwardly from the both sides of the plate 602. Inside the housing 610, there is provided a gear body 610d, which is integrally formed with the housing 610, and has a gear teeth on its outer surface, and there is formed a path between the inner wall of the housing 610 and the gear body 610d there inside. In addition, a gear case 610c having a gear teeth therein is rotatably fit into the inner wall of the housing 610, and therefore, even though the revolution gear 850f provided on the revolution axis 850 and the gear teeth of the gear body 610d are meshed with each other and rotated, the gear case 610c is rotated to the opposite direction. That is, the gear case 610c can stably stand even with the rotation of the day-and-night division plate 602.

Therefore, on the contrary to the structure as described above, even if the gear body 610d is designed to rotate, and the gear case 610c is fixed on the inner wall of the housing 610 so that the revolution gear 850f is meshed with the gear teeth of the gear case 610c, the same result as the above occurs.

The important matter on this is to arrange the size and the number of the gear teeth of the gear body 610d and the revolution gear 850f proportional or inversely proportional to the size and the number of the gear teeth of the knob 856 of the revolution axis and the gear teeth of the orbit of the Earth 860c at a predetermined rate according to their rotation radius respectively so that the gear body 610d and the revolution gear 850f rotates one cycle per year. This matter will be described below in more detail.

In addition, the both sides of the day-and-night division plate 602 can be coated with the materials of different characteristics or different colors for efficient illumination, and for the housing 610, it is preferable to make its day side 610a transparent, and make its night side 610b translucent or obscure so that the light from the optical source can pass through.

In addition, an optical source 620 are provided at the center of the both sides of the day-and-night division plate 602 for illumination, and the optical source 620 is fixed on a socket 620a, and a reflection cover 620b is provided toward the emitted direction of light to make the illumination of the emitted light uniform. Also, by using a timer sensor, etc., the illuminance or color, etc. of the optical source 620 can be variously changed corresponding to the time of dawn or dusk or night for sleeping, etc.

In addition, an ecliptic indicating lamp 680 can be provided on the outer surface with fixed to the reflecting cover 620b so that the illumination of the ecliptic indicating lamp 680 indicates which portion of the Earth accesses to the Sun most closely during the rotation of the Earth, and the variance of the ecliptic according to the inclination of the Earth axis can be provided from the outer look of the Earth globe.

In the revolution unit 600 structured above, if a user rotates the knob 856 of the revolution axis 850 by hand, the revolution gear 850f installed on the end of the revolution axis 850 rotates the gear body 610d of the housing 610. Accordingly, the housing 610 and the day-and-night division plate 602 revolve once per year relative to the north-pole and the south-pole. In addition, by applying power to the optical source 620 to emit light, the changes of day and night on the areas of the Earth globe can be realized by the rotation of the Earth globe 500, itself.

Figure 13:
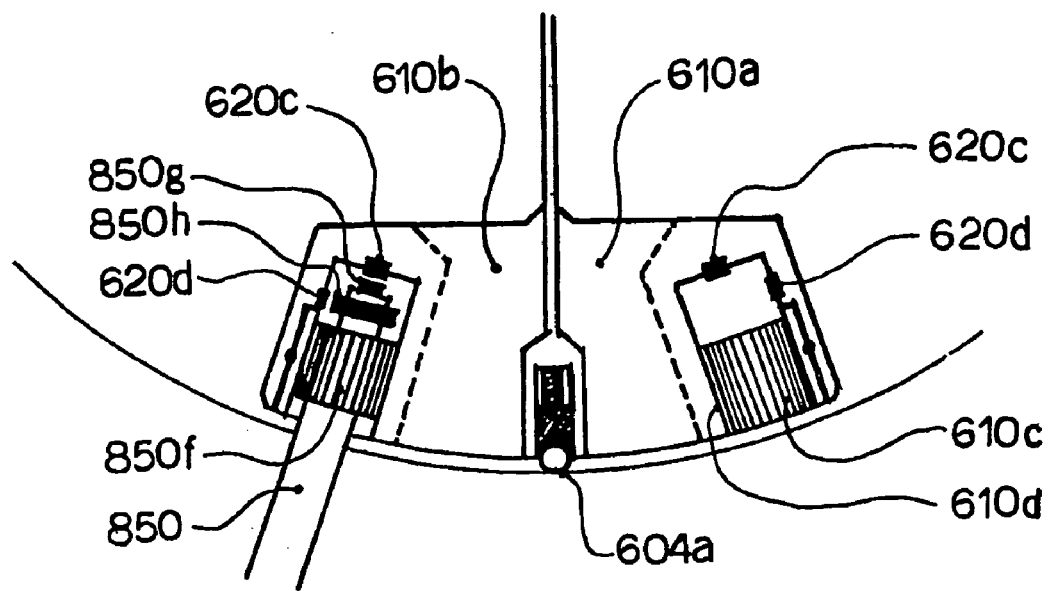
FIG. 13 is a sectional view of a modification example of a housing of the revolution unit.
Figure 13:
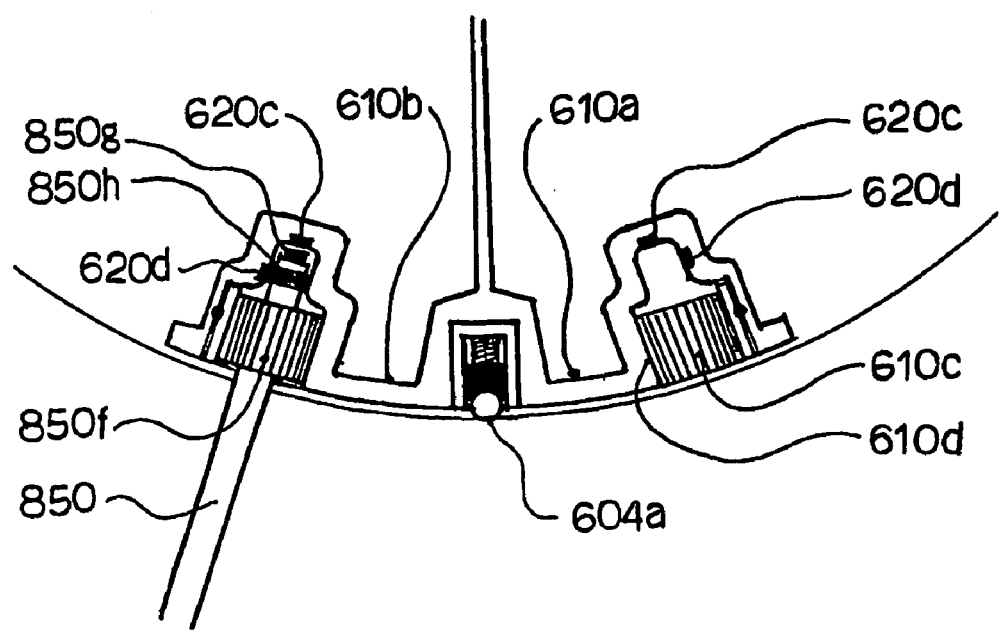

The shape of the housing 610 can be variously modified, and for example, in case of employing the housing 610 in a small size of the Earth globe as shown in FIG. 13, the size of the housing 610 should be decreased, and its shape can be changed, too. The size of the revolution gear can be provided more precisely.

Figure 14:
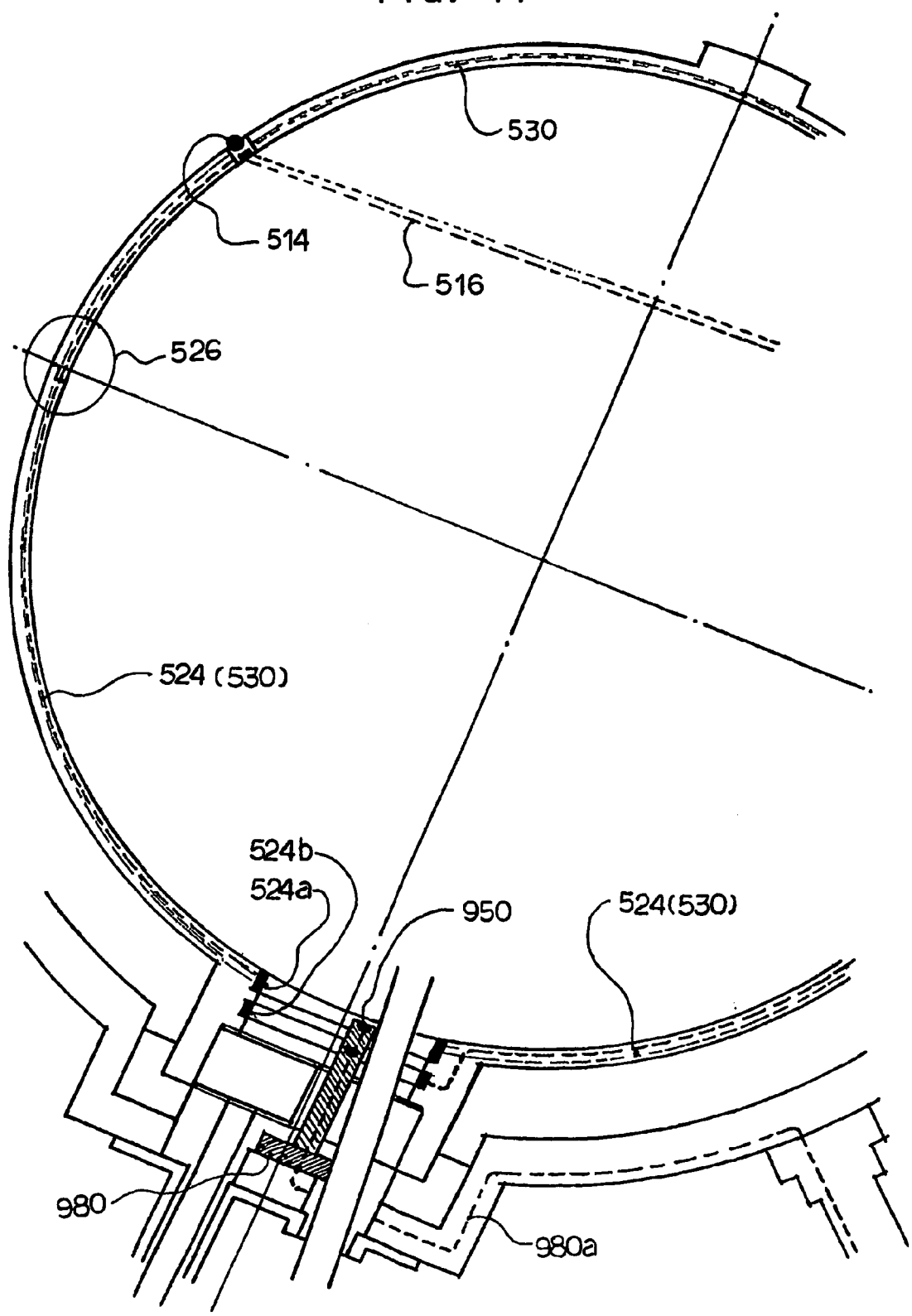
FIG. 14 is an explanation view to illustrate the method of supplying a power of one embodiment of the present invention.
Figure 15:
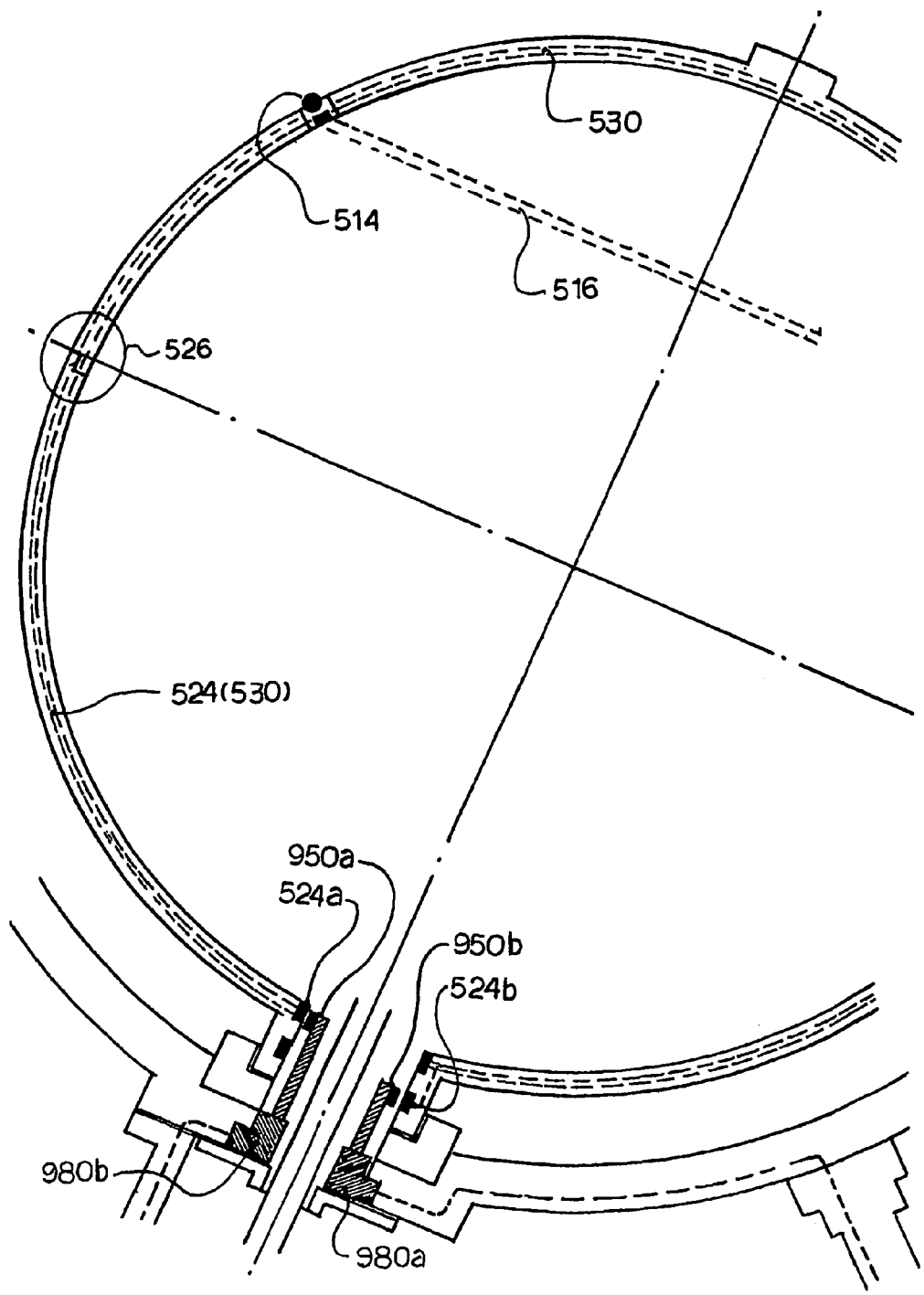
FIG. 15 is an explanation view to illustrate the method of supplying a power of another embodiment of the present invention.
Figure 16:
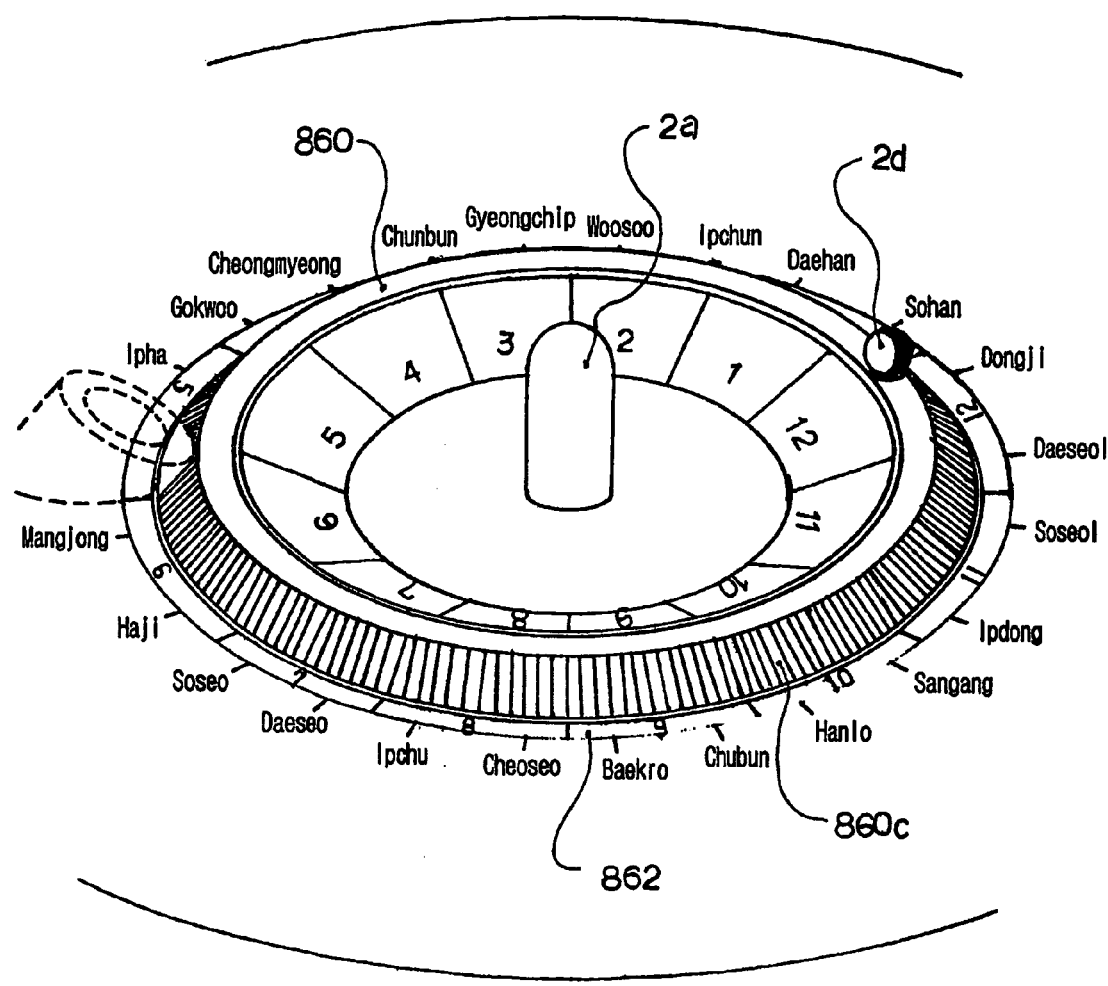
FIG. 16 is a perspective view of a revolution orbit unit of one embodiment of the present invention.
Figure 17:
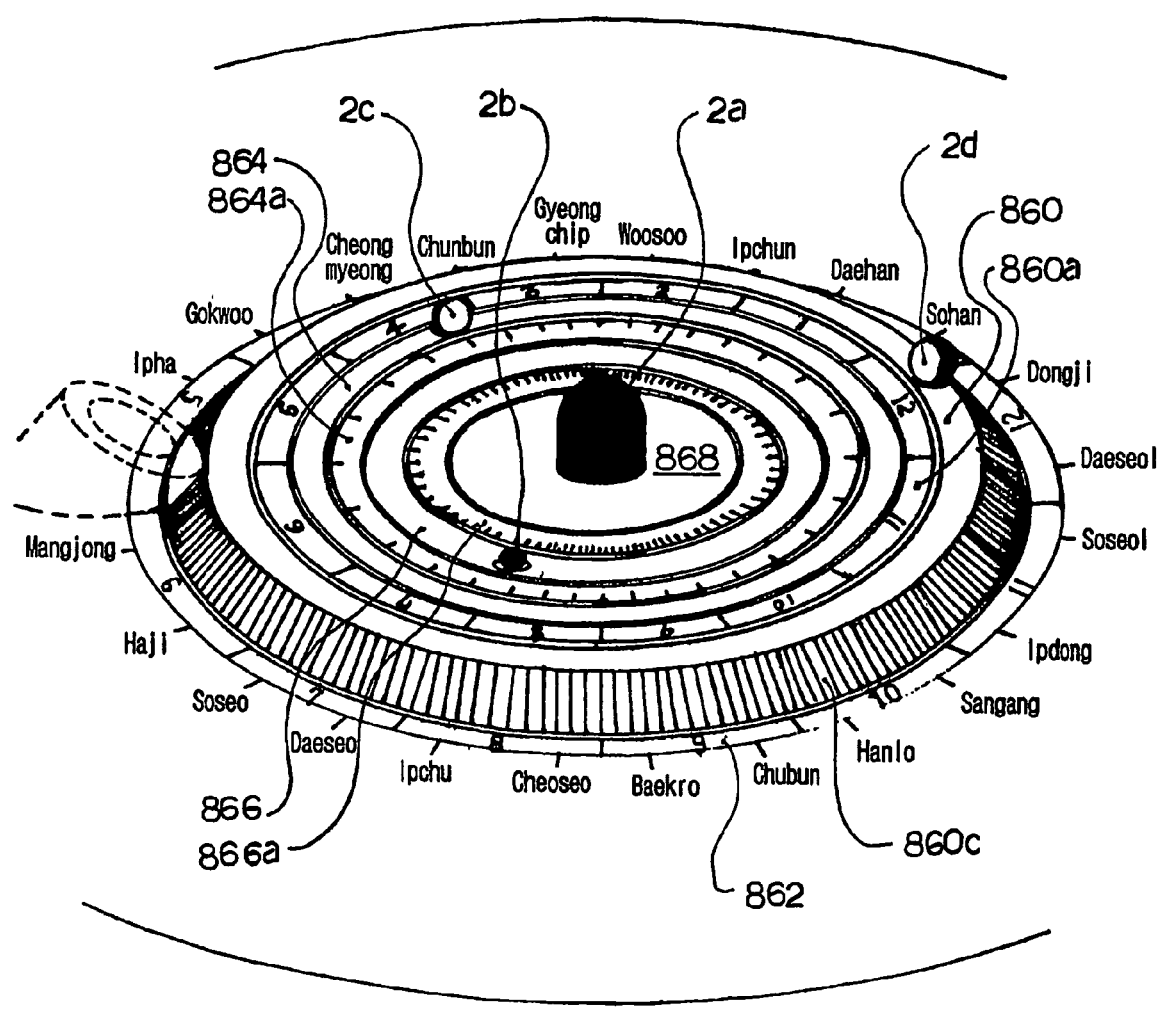
FIG. 17 is a perspective view of a revolution orbit unit of another embodiment of the present invention.

FIGS. 13 to 15 illustrate the various kinds of power supply methods.

In the present invention, the units for power to be supplied are the optical source 620 of the revolution unit 600, the location indicating lamp 514 formed on the outer surface of the Earth globe, the ecliptic indicating lamp 680, the driving motor 216, 820 for driving the Earth globe, the light-emitting lamp 204 for displaying the operation states, the controlling interface 210, and the like.

As described above, the outer shell of the Earth globe, the support arm, and the inside of the rotation axis and the revolution axis can be used as paths for various power lines or control lines.

Referring to FIG. 13, the power lines and the control lines, etc. extended to the inner path of the revolution axis 850 are connected to the connectors 850a, 850h formed on the end of the revolution axis 850, and the connectors 850g, 850h are connected to the conductive layer 620c, 620d, which are formed along the path bottom and the side wall of the housing 610, so that power is supplied to the optical source 620 or the location indicating lamp 514 through the conductive lines 620c, 630c of FIG. 11 respectively.

Another method of supplying power to the location indicating lamp 514 is illustrated in FIGS. 11 and 12. The elastic member 630a is provided inside the support 630 connected to the conductive path 630c, a contact pad 630b is provided on the elastic member 630a, and the contact pad 630b is contacted with the conductive path (516 of FIG. 5) formed inside the Earth globe 500 so that light is emitted from the location indicating lamp 514 which is connected to the conductive path 516. Since the conductive path 516 is formed along a specific latitude on the overall Earth globe with a predetermined width, there emits the light from the location indicating lamp 514 located on a corresponding latitude with a switch on.

As another method, as shown in FIG. 6, a conductive rod 950 is fixed on the support holder 704b integrally provided on the lower support arm 704 by using the fixing nut 980, the power lines and control lines 980a, which are extended through the inside of the lower support arm 704, are connected to connectors 952, 954, which are formed of elastic member. If the connectors 952, 954 are connected to the contact pads 524a, 524b formed on the inner wall of the cylindrical-shaped protrusion 506 of the Earth globe as shown in FIGS. 14 and 15, power is applied on the location indicating lamp 514 through the power lines and the control lines 524 provided under the outer surface of the Earth globe 500 and passes through a terrestrial equator interface 526 to emit light.

As another method, the outer shell of the Earth globe 500 is formed with a predetermined thickness, or formed with a cavity wall to secure space there inside, and a plastic conductor or a plastic circuit board 530 is provided inside the outer shell or the secured space to ensure a light-emitting unit or by using optical fiber, a laser can be emitted so as to indicate a specific location.

By indicating locations on the Earth globe as described above, even with night time, the place where a user lives can be identified. In addition, the location of the Sun relative to the above location can be also identified by the ecliptic lamp 680.

FIG. 15 illustrates a method of placing a different conductive rod 950a, 950b on every location indicating lamp 514 just in the same manner as the above, and this can be mostly used in the case of installing the revolution axis 850 only on the Earth globe without the rotation axis 810 as described in FIG. 3.

FIGS. 16 to 19 illustrate revolution orbit units of each planet inside the solar system.

The inferior revolution orbit unit 218 is configured in such a manner that a model of the sun 2a, a model of the mercury 2b, a model of the Venus 2c, and a model of the Earth 2d are fixed on a respective revolution orbit, a rotation orbit of the sun 868, an orbit of the mercury 866, an orbit of the Venus 864, and an orbit of the Earth 860, and move according to the rotation of each orbit. A mercury cycle scale 866a, a Venus cycle scale 864a, and an Earth cycle scale 860a are provided close to each revolution orbit, and accordingly, the current location of each planet can be indicated. The revolution orbit of the mercury is notably elliptical-shaped compared with the revolution orbits of the other planets. Therefore, if marking the revolution cycle scale as an elliptical shape while showing the revolution orbit of the model of the mercury as a circular-shape just as the same as the natural phenomenon, educational effect can be increased for users.

Figure 18:
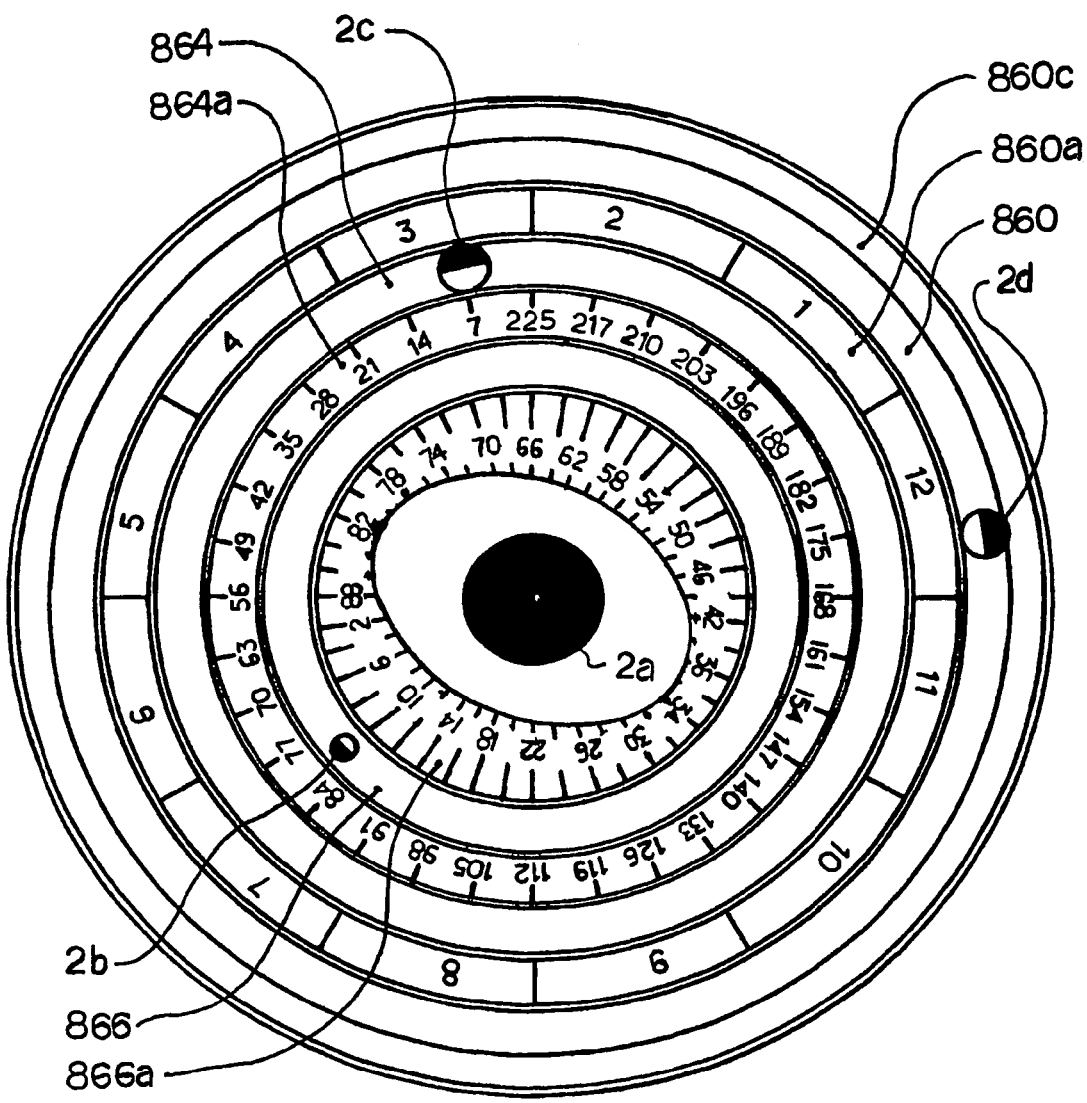
FIG. 18 is a plane view of FIG. 17.

As for the revolution cycle indication of the planets in FIG. 18, since the actual revolution cycle of the Mercury is 87.97 days by the standard of the Earth time, 88 number of scales are marked, and since the actual revolution cycle of the Venus is 224.7 days, it is calculated as 225 days, and 32 number of scales are marked with one week (7 days) per scale. As for the Earth, 12 number of scales are marked with one month per scale, but the number of scales can be adjusted according to actual products and the size of limited space, for example, with the unit of one week or in other ways.

In addition, a gear teeth 860c is provided on the outer side surface of the orbit of the Earth 860, and the gear teeth 860c is meshed with the knob 856 of the revolution axis 850 so that the orbit of the Earth 860 is rotated according to the rotation of the knob. In addition, on the base 200 out of the orbit of the Earth 860, there are marked days of one year and 24 divisions of the year, and the location relations between the Sun, the Planets, and the Earth, and therefore, the states in the current location of the Earth can be shown in the Earth globe 500 as the same as the current states of the Earth.

The sizes of the Earth revolution orbit and the revolution orbit of inferior planets are the same as the size of the gear teeth of the gear body 610d inside the housing 610 of the revolution unit installed inside the Earth globe, or proportional thereto, or inversely proportion thereto. That is, to make the day-and-night division plate 602 rotate one cycle just as the same as the revolution cycle of the Earth, i.e., one cycle per year, the size of the gear teeth and the number of the gear teeth, etc. are adjusted according to the size of the revolution radius of each unit at a predetermined rate. Therefore, since the size and the rate of the gear teeth 860c of the orbit of the Earth and the gear teeth 856 of the knob of the revolution axis are the same as the size and the rate of the gear teeth of the gear body 610d and the revolution gear 850f of the revolution axis, or proportional to or inversely proportional to at a specific rate, if one of them becomes bigger or smaller, the sizes of all of them should be reduced or increased at the same rate so that all of them are revolved one cycle per year.

In addition, fluorescent material is deposited on each orbit, and a light-emitting device is installed inside the planets so that the location thereof can be recognizable at night by the device and the location indicating lamp 514 of the Earth globe 500. The rotation can be driven by hand, and even though not shown in the drawings, a driving unit can be installed in the empty space of the base 200 so that its operation and rotation are possibly driven automatically.

Figure 19:
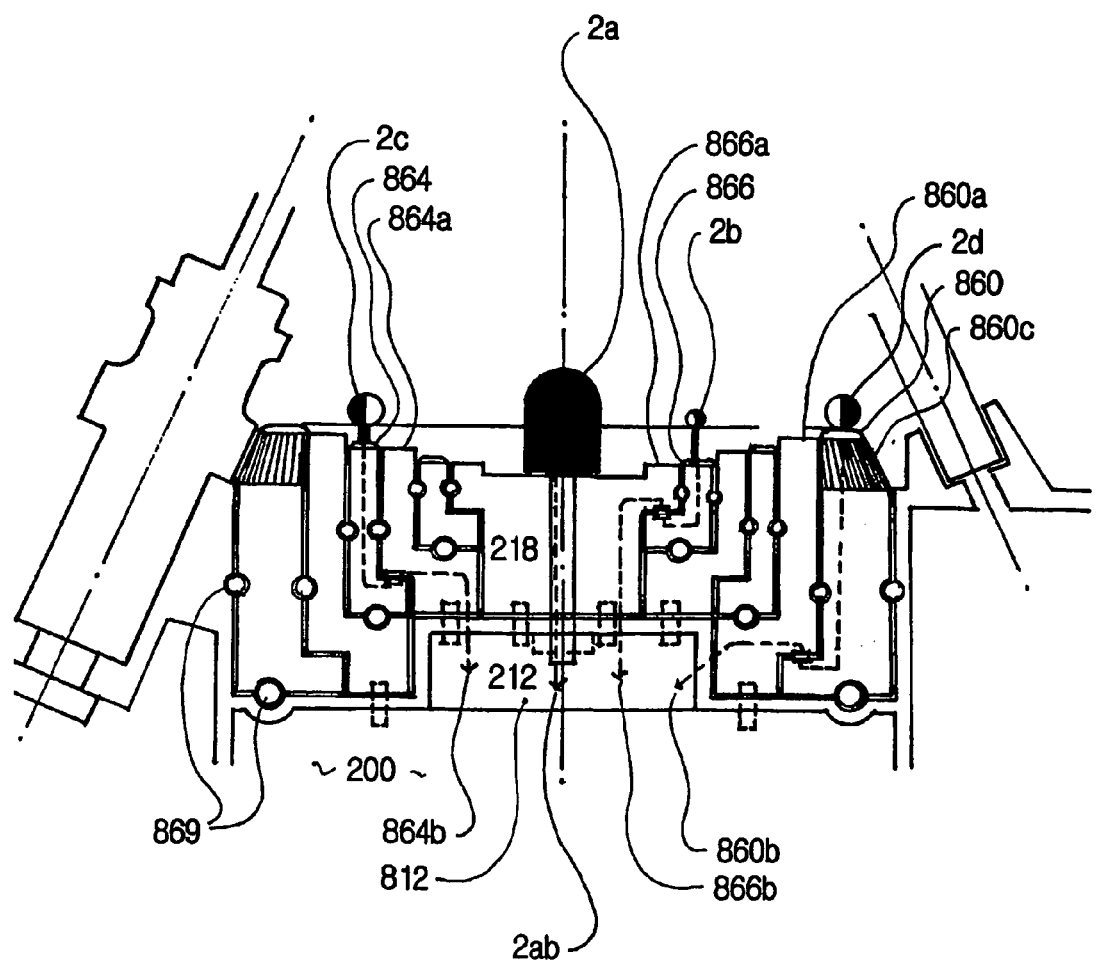
FIG. 19 a sectional view of the revolution orbit unit.

As shown in FIG. 19, each revolution orbit can show its rotation separately and easily by installing the ball bearing 869 on its adjacent side wall and a bottom, and the power supply to the light-emitting lamp provided inside each planet 2a, 2b, 2c, 2d is transmitted through the connectors 2ab, 860b, 864b, 866b provided on the bottom of each orbit on which a power source supplied from the base 200 is provided.

Referring to FIG. 20, the pad-type solar system 300 is supported by a support rod 130, which is connected to the auxiliary unit connecting part 123 of the support arm 700 of the Earth globe 500, and is coupled by a ball joint to rotate in any direction. The power lines and the control lines, etc. passing through the auxiliary unit connecting part 123 and the support rod 130 are extended to the solar system, and supplied to the operation units and light-emitting lamps of the planets and stars, too.

In addition, a time scaling ring 730 is provided along the equator between the outer surface of the Earth globe 500 and the support arm 700, and the time scaling ring 730 includes a pair of male and female ring, and they are coupled with each other by a male and a female recessed-groove formed on their both ends and a time scaling coupling part 732 provided on the support arm 700.

In addition, the lower part of the time scaling ring 730 has a gear teeth, and the gear teeth is meshed with the end of a rotating bolt 734, which is integrally provided on the coupling part 732 formed on the support arm 700 so that the rotation of the rotating bolt 734 makes the time scaling ring 730 move. Therefore, by using the above, the standard scale of the day-and-night division plate 602 inside the Earth globe 500 consists with that of the time scaling ring 730. That is, since an 'east' end of the right-and-left sides of the day-and-night division plate 602 always shows the time for sunrise, and a 'west' end thereof always shows the time for sunset, if the sunrise time displayed on the time scaling 732 consists with the east end of the day-and-night division plate 602, the time of the overall area on the Earth globe can be indicated while the Earth globe 500 rotates on its axis.

In addition, if the time scaling 730 is provided to consist with the latitude of other area not with the equator, the time difference between one area and other area can be more easily indicated because the light from the location indicating lamp 514 of the corresponding area can be recognized by the fluorescent material or the nightglow material of the time scaling 730.

The above description was mostly focused on just the embodiments of the present invention, but it will be apparent to those skilled in the art that various modifications and variations can be made in the present invention.

For example, a distance measurement device toward the sun in the direction perpendicular to the day-and-night division unit can be provided by using the auxiliary unit connecting part with the same scale as that of the Earth globe in order to measure the distance which varies every time according to the distance away from the Sun to a corresponding location. The application as above is possibly provided with the auxiliary unit connecting part, the day-and-night division unit, and the location indicating lamp of the present invention, and therefore, various applications with the Earth globe of the present invention can be made.

INDUSTRIAL APPLICABILITY

As described above, the present invention provides the globe apparatus for showing rotation and revolution and realizing in the Earth globe apparatus of the present invention as the same as actual states related with the Earth, the Sun, and the Planets, etc., for example, the changes of day and night, the time difference according thereto, the changes of seasons and 24 divisions of the year in the lunar calendar, the changes of the locations and distance of the Sun and the Earth, the changes of the locations of the Planets in the solar system according to the revolution, etc.

Additionally, since various information transmitted from a user computer connected with a server of a remote area through an internet, for example, the current time, month, day, date, temperature, humidity and the time of ebb and full tide around the countries, the appearance time of the Planets and satellites, and the like, can be displayed on the display of the present invention, the current state which the Earth globe shows can be informed in detail, and the more detailed information can be displayed on the user computer to additionally help the education purposes. Furthermore, all states of the Universe can be provided by using a voice output unit to optimize the educational effect for students.

Additionally, since the all states of the Universe can be realized in the Earth globe as the same as the actual states, the globe apparatus of the present invention can be used very efficiently in usual lives as well as for the educational purposes.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A globe apparatus capable of showing rotation and revolution of an Earth globe, the apparatus comprising:
    a base to which one end of a support rod is fixed and one end of a revolution axis is rotatably coupled;
    a support arm fixedly coupled with the support rod;
    an Earth globe rotatably coupled with the support arm at two confronting points of the Earth globe with inclination;
    a revolution unit placed inside the Earth globe and revolving relative to the two confronting points coupled with the revolution axis, and showing day and night separately according to the rotation of the Earth globe; and
    a display which is installed on the base, and displays information transmitted from a computer relating to rotation and revolution of the Earth globe.

2. The globe apparatus of claim 1, wherein the Earth globe rotates via a gear coupled with a rotation axis and rotating by a driving motor.

3. The globe apparatus of claim 1, further comprising an inferior planet revolution orbit unit which is provided at the center of the base, and includes an orbit of the Earth revolving via a gear coupled with the revolution axis and having a model of the Earth.

4. The globe apparatus of claim 3, wherein the inferior planet revolution orbit unit comprises a model of the Sun at its center, an orbit of the Mercury including a model of the Mercury, and an orbit of the Venus including a model of the Venus around the model of the Sun and inside the orbit of the Earth, the orbit of the Mercury, the orbit of the Venus, and the orbit of the Earth revolving individually.

5. The globe apparatus of claim 1, wherein the revolution unit comprises:
    a disc-shaped day-and-night division plate spaced apart by a constant interval from the internal surface of the Earth globe;
    a coaxially cylindrical-shaped housing integrally formed with a lower part of the day-and-night division plate, and having a gear body therein, the gear body being coupled with a revolution gear of the revolution axis;
    an optical source provided on both sides of a center of the day-and-night division plate; and
    a bearing unit provided on uppermost and the lowest ends of the day-and-night division plate, and applying pressure to the inner surface of the Earth globe to function as a rotation pivot of the revolution unit.

6. The globe apparatus of claim 1, wherein the support arm has an inner space for a power line and a control line, the Earth globe has dual shells forming an inner space between the dual shells, in which a location indicating lamp is provided there-in, and the power line and the control line are extended there-into.

7. A globe apparatus capable of showing rotation and revolution of an Earth globe, the apparatus comprising:

a base to which a first support rod and a second support rod accommodating a rotation axis therein are fixed, and to which one end of a revolution axis is rotatably coupled;

a ring-shaped support arm fixedly coupled to the first support rod and the second support rod;

an Earth globe rotatably coupled with the support arm at two confronting points with inclination, and rotating on the rotation axis;

a revolution unit placed inside the Earth globe and revolving relative to the two confronting points coupled with the revolution axis, and showing day-and-night state of the Earth globe separately according to the rotation of the Earth globe by using an optical source; and an inferior planet revolution orbit unit installed at the center of the base, and having a model of the Sun at its center, an orbit of the Mercury including a model of the Mercury, an orbit of the Venus including a model of the Venus, and an orbit of the Earth including a model of the Earth around the model of the Sun, the orbit of the Mercury, the orbit of the Venus, and the orbit of the Earth revolving independently and located closely with each other.

8. A globe apparatus capable of showing rotation and revolution of an Earth globe, the apparatus comprising:

a base to which one end of a support rod is fixed and one end of a revolution axis is rotatably coupled;

a ring-shaped support arm fixedly coupled to the support rod;

an Earth globe rotatably coupled with the support arm at two confronting points of a south pole and a north pole with inclination;

a revolution unit placed inside the Earth globe and revolving relative to the two confronting points coupled with the revolution axis, and showing day-and-night state of the Earth globe separately according to the rotation of the Earth globe by using an optical source; and a driving unit being coupled with the Earth globe at the north pole of the Earth globe, and having a driving motor provided therein, a motor axis of the driving motor being coupled with the north pole of the Earth globe.

9. A globe apparatus capable of showing rotation and revolution of an Earth globe, the apparatus comprising:

a base to which one end of a support rod is fixed and one end of a revolution axis is rotatably coupled;

a support arm fixedly coupled to the support rod;

an Earth globe rotatably coupled with the support arm at two confronting points of the Earth globe with inclination;

a revolution unit placed inside the Earth globe and revolving relative to the two confronting points coupled with the revolution axis, and showing day and night separately according to the rotation of the Earth globe; and an inferior planet revolution orbit unit installed at the center of the base, revolving with gear-engaged with the revolution axis, and having an orbit of the Earth including a model of the Earth, wherein the Earth globe is configured to show the state of the Earth in a specific date as the same as that of the Earth corresponding to the specific data along the orbit of the Earth by separating the revolution axis from a toothed gear of the orbit of the Earth, rotating the orbit of the Earth to locate the model of the Earth at the specific data along the orbit of the Earth, and coupling the separated revolution axis with the orbit of the Earth.

10. The globe apparatus of claim 9, wherein the inferior planet revolution orbit unit is configured that a model of the Sun is placed at its center, and an orbit of the Mercury including a model of the Mercury, and an orbit of the Venus including a model of the Venus are placed to revolve individually around the model of the Sun and inside the orbit of the Earth; and wherein days in a year unit, dates, divisions of the year in the lunar calendar, and a revolution cycle are marked on the base along the orbit of the Earth, and the locations changes of the Mercury and the Venus according to the day of the Earth based on the revolution cycle are indicated.

11. The globe apparatus of claim 10, wherein optical sources are provided inside the model of the Sun, the model of the Mercury, the model of the Venus, and the model of the Earth to emit light at night.

* * * * *